United States Patent
Yoshioka

(10) Patent No.: US 8,032,011 B2
(45) Date of Patent: Oct. 4, 2011

(54) RECORDING MEDIUM HAVING RECORDING PROGRAM RECORDED THEREIN AND RECORDING APPARATUS AND METHOD

(75) Inventor: Shingo Yoshioka, Kanagawa (JP)

(73) Assignees: Sony Corporation, Tokyo (JP); Pioneer Corporation, Tokyo (JP)

( * ) Notice: Subject to any disclaimer, the term of this patent is extended or adjusted under 35 U.S.C. 154(b) by 1555 days.

(21) Appl. No.: 10/421,611

(22) Filed: Apr. 23, 2003

(65) Prior Publication Data

US 2003/0202778 A1 Oct. 30, 2003

(30) Foreign Application Priority Data

Apr. 25, 2002 (JP) .............................. P2002-124604

(51) Int. Cl.
*H04N 5/92* (2006.01)

(52) U.S. Cl. ..................................... 386/326
(58) Field of Classification Search ............ 386/95
See application file for complete search history.

(56) References Cited

U.S. PATENT DOCUMENTS

| 6,215,746 | B1 | 4/2001 | Ando et al. | |
|---|---|---|---|---|
| 6,611,656 | B2 * | 8/2003 | Okada et al. | 386/125 |
| 2002/0018643 | A1 * | 2/2002 | Okada et al. | 386/95 |
| 2002/0018644 | A1 | 2/2002 | Isobe et al. | |
| 2002/0069209 | A1 * | 6/2002 | Kurihara et al. | 707/104.1 |
| 2002/0152349 | A1 | 10/2002 | Kageyama et al. | |
| 2003/0123857 | A1 * | 7/2003 | Egawa et al. | 386/111 |
| 2007/0086749 | A1 * | 4/2007 | Isobe et al. | 386/95 |

FOREIGN PATENT DOCUMENTS

| EP | 1 041 565 | 10/2000 |
|---|---|---|
| JP | 7 282288 | 10/1995 |
| JP | 11 242850 | 9/1999 |
| JP | 2000 57746 | 2/2000 |
| JP | 2001 223980 | 8/2001 |
| JP | 2002 50131 | 2/2002 |
| JP | 2002 63765 | 2/2002 |
| JP | 2002 112262 | 4/2002 |

* cited by examiner

*Primary Examiner* — Peter-Anthony Pappas
*Assistant Examiner* — Daniel Tekle
(74) *Attorney, Agent, or Firm* — Frommer Lawrence & Haug LLP; William S. Frommer; Paul A. Levy

(57) ABSTRACT

A recording apparatus for recording a moving picture file and a still picture file to a program area on an optical disk, capable of converting the format of management information to be recorded in combination with the file according to the attribute of the file.

22 Claims, 16 Drawing Sheets

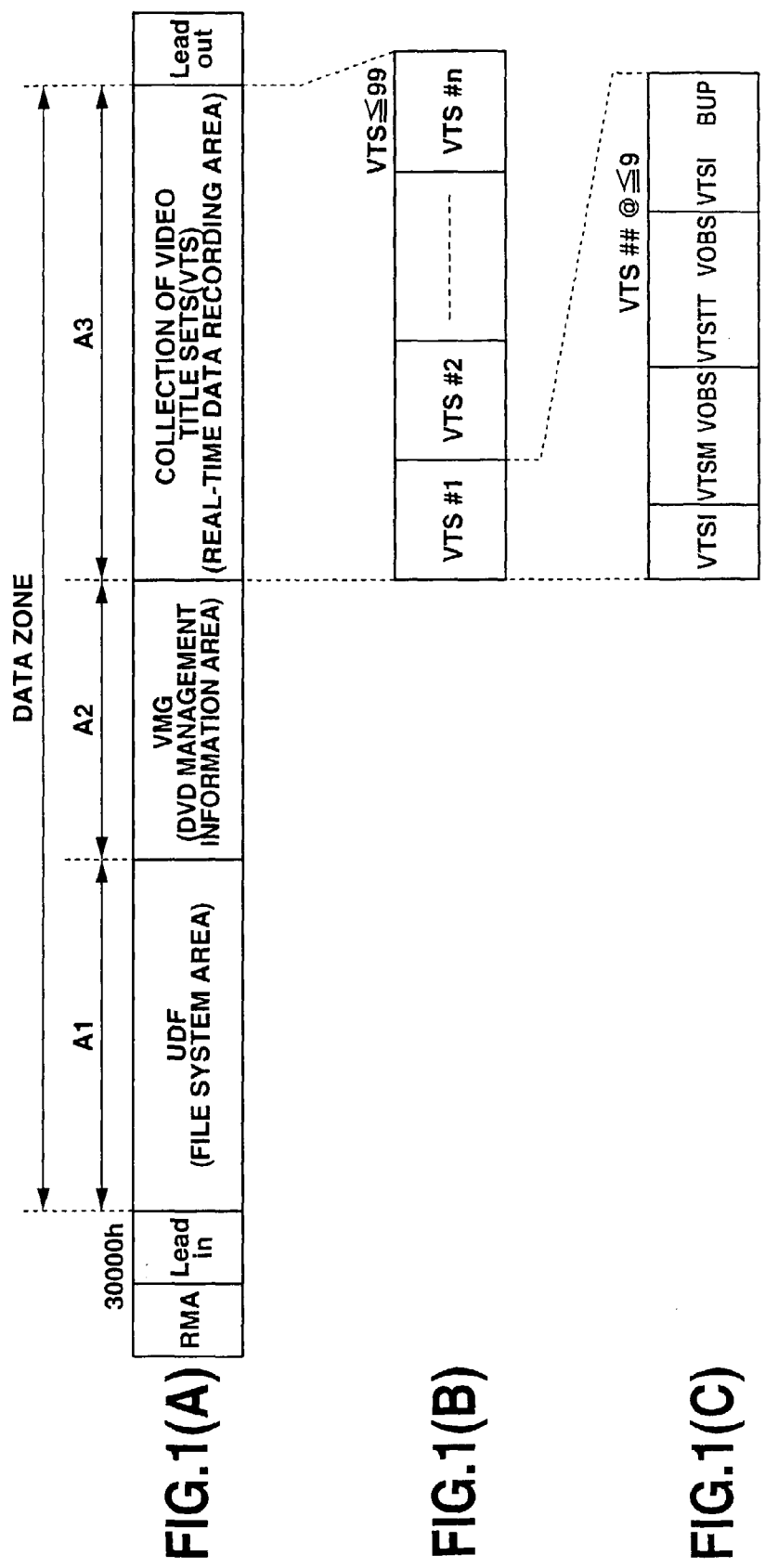

FIG.2(A) | Rzone 1 | Rzone 2 | Invisible Rzone

FIG.2(B) | Rzone 1 | Rzone 2 | VTSTT VOBS | VTSI / BUP

FIG.2(C) | Rzone 1 | VTSI | VTSM VOBS | VTSTT VOBS | VTSI / BUP

FIG.2(D) | Rzone 1 | VTS #1 | Rzone 3 | Invisible Rzone

FIG.2(E) | Rzone 1 | VTS #1 | Rzone 3 | VTSTT VOBS | VTSI / BUP

FIG.2(F) | Rzone 1 | VTS #1 | VTSI | VTSM VOBS | VTSTT VOBS | VTSI / BUP

FIG.2(G) | Rzone 1 | VTS #1 | VTS #2

FIG.2(H) | Lead in | UDF | VMG | VTS #1 | VTS #2 | --- | VTS #n | Lead out

FIG.3(A) | Padding

FIG.3(B) | Padding | VTSTT VOBS | VTSI BUP | Padding

FIG.3(C) | Padding | VTSI | VTSM VOBS | VTSTT VOBS | VTSI BUP | Padding

FIG.3(D) | Padding | VTS #1 | Padding | VTSTT VOBS | VTSI BUP | Padding

FIG.3(E) | Padding | VTS #1 | VTSI | VTSM VOBS | VTSTT VOBS | VTSI BUP | Padding FIG.3(F) | Padding | VTS #1 | VTS #2 | Padding FIG.3(G) | Lead in | UDF | VMG | VTS #1 | VTS #2 | -------- | VTS #n | Lead out

| | | |
|---|---|---|
| FIG.4(A) | Rzone 1 | Rzone 2 | Invisible Rzone |

| FIG.4(B) | Rzone 1 | Rzone 2 | VTSTT VOBS | VTSI BUP |

| FIG.4(C) | Rzone 1 | VTSI | VTSM VOBS | VTSTT VOBS | VTSI BUP |

| FIG.4(D) | Rzone 1 | VTSI | VTSM VOBS | VTSTT VOBS | VTSI BUP | Invisible Rzone |

| FIG.4(E) | Rzone 1 | VTS #1 | EF |

| FIG.4(F) | Rzone 1 | VTS #1 | EF | Rzone 3 |

| FIG.4(G) | Rzone 1 | VTS #1 | EF | DK |

| FIG.4(H) | Rzone 1 | VTS #1 | EF | DK | Rzone 4 | Invisible Rzone |

| FIG.4(I) | Rzone 1 | VTS #1 | EF | DK | VTSI | VTSM VOBS | VTSTT VOBS | VTSI BUP |

| FIG.4(J) | Rzone 1 | VTS #1 | EF | DK | VTS #2 |

| FIG.4(K) | Lead in | UDF | VMG | VTS #1 | EF | DK | VTS #2 | Lead out |

FIG.4(A)
FIG.4(B)
FIG.4(C)
FIG.4(D)
FIG.4(E)
FIG.4(F)
FIG.4(G)
FIG.4(H)
FIG.4(I)
FIG.4(J)
FIG.4(K)

| VTS | FJ1 | FJ2 | FJ3 | FM71 | FM72 | FM41 | FM42 | DK |

FIG.7(A)

| HEADER | | | |
|---|---|---|---|
| JPEG | DJ | DM7 | DM4 |
| MPEG7 | | | |
| MPEG4 | | | |

FIG.7(B)

| DFJ1 | DFJ2 | DFJ3 |

FIG.7(C)

| ATTRIBUTE |
| ADDR |
| SIZE |
| DATE AND TIME |

FIG.7(D)

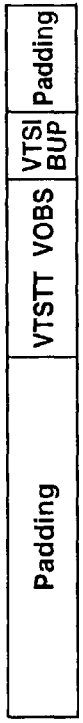
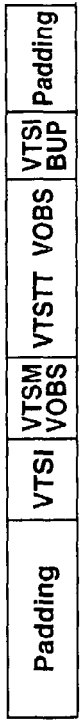
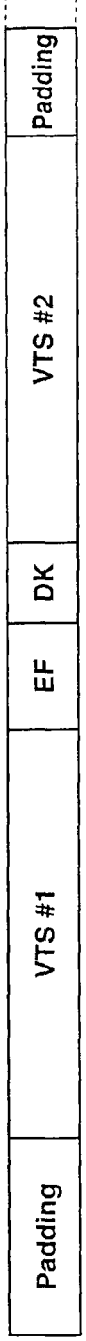

RECORDING MEDIUM HAVING RECORDING PROGRAM RECORDED THEREIN AND RECORDING APPARATUS AND METHOD

BACKGROUND OF THE INVENTION

1. Field of the Invention

The present invention relates to a recording apparatus, a recording method, a recording program, and a recording medium having the recording program recorded therein. The present invention is applicable to a DVD (digital versatile disk), for example. According to the present invention, a file of still pictures other than moving pictures can also be recorded by selecting a format for the management information to be recorded in combination with the file on the basis of the attribute of the file. Also, according to the present invention, a standard optical disk drive is allowed to check the content of a file of still pictures other than moving pictures recorded in an optical disk for example by recording a file recorded in the optical disk in a format selected for the file.

This application claims the priority of the Japanese Patent Application No. 2002-124604 filed on Apr. 25, 2002, the entirety of which is incorporated by reference herein.

2. Description of the Related Art

Conventionally, there are available DVDs as large-capacity optical disks including writable DVDs (digital versatile disk) such as a DVD-R (DVD-recordable), DVD-RW (DVD-rewritable) and DVD-RAM (DVD-random access memory). Of these DVDs, DVD-R and DVD-RW having video data recorded therein in a format complying with the DVD video format can be played by a reproduce-only optical disk drive or a computer to reproduce the video data.

FIG. 1 shows a chart explaining the DVD video format-based logical format of an optical disk. As shown in FIG. 1(A), the optical disk logically formatted according to the DVD video format has an information recording area thereof divided into a zone called "lead-in" at the innermost circumference thereof, a data zone and a zone called "lead-out" at the outermost circumference. The optical disk will have desired video data or the like recorded to the data zone thereof.

As shown, the data zone consists of a UDF (universal disk format) area (file system area) A1, VMG (video manager) area (DVD management information area) A2 and a real-time data recording area A3 in this order from the lead-in zone. The UDF and VMG areas are provided to record management information used to manage files of video data recorded in this optical disk. Of these UDF and VMG areas, the VMG area A2 which is a second management information recording area is directed to a video file management system unique to the DVD video format and will have recorded thereto TOC information (table of contents) used for management of all video data recorded in the real-time data recording area A3. On the other hand, the UDF area A1 which is a first management information recording area is directed to a file management by a computer, and will have recorded thereto management information used for management of all the video data recorded in the real-time data recording area A3 in a format compatible with the file management system of the computer.

As shown in FIG. 1(B), the real-time data recording area A3 is a program area where real data are to be recorded, and will have video data recorded therein in units of VTS (video title set; will be referred to simply as "title" wherever appropriate hereunder). It should be noted that a maximum of 99 VTSs can be provided. It is also important to note that as shown in FIG. 1(C), the "VTS" is composed of VTSI (video title set information), VTSM VOBS (video object set for the VTSM), VTSTT VOBS (video object set for titles in a VTS), and VTSI BUP (backup of VTSI) in this order. VTSTT VOBS will have recorded thereto MPEG (Moving Pictures Experts Group)-2-formatted video data as real video data, VTSI will have recorded thereto the address information etc. for management of the video data composed of real data, and VTSM VOBS will have a title menu of the video data recorded thereto. It should be noted that VTSM VOBS is an option and VTSI BUP is a backup of VTSI.

When the above optical disk is accessed by a computer, a desired file can be searched based on UDF for reproduction. When the optical disk is reproduced by a DVD player, a desired file can be searched based on VMG for reproduction.

Video data is written to such an optical disk by either an incremental recording method (will be referred to as "INC method" hereunder) or restricted overwrite method (will be referred to as "ROW method" hereunder). The INC method is intended for sequential recording of video data, while the ROW method is applied to an overwritable optical disk. In the ROW method as well, however, video data which are to be recorded to a fresh (unrecorded) area will sequentially be recorded. In these INC and ROW methods, an RMA (recording management area) defined along the inner circumference of the lead-in zone provides an area management of an operation, such as reservation, to the optical disk.

FIG. 2 is a chart for explaining the INC-based recording procedure. For the INC-based recording, it is defined that data should be recorded to up to three areas each called "Rzone". Each Rzone is managed under the RAM standard.

More specifically, in the INC-based recording of moving pictures, Rzones are first reserved as shown in FIG. 2(A). For this reservation of Rzones, a Rzone 1 for UDF and VMG areas in which management information is to be recorded is defined, a next Rzone 2 for VTSI and VTSM VOBS of a top VTS is defined in an unrecorded area forming a real-time data recording area, and a remaining unrecorded area is defined as "invisible Rzone". In the INC method, the management information recording area and also the areas fin which VTSI and VTSM VOBS of the top VTS are to be formed are reserved by reserving the Rzone1 and Rzone2.

In the INC method, VTSTT VOBS of real data is defined by recording video data sequentially starting at the beginning of "Invisible Rzone". Further, upon completion of recording of the real data under one title with a user's instruction, VTSI BUP is recorded next to the recording of the real data as shown in FIG. 2(B) and VTSI and VTSM VOBS are defied in the Rzone 2 again at the beginning and the Rzone 2 is closed as shown in FIG. 2(C). Thus, one VTS is recorded to the optical disk by the INC method.

In the INC method, for continuously recording a next title, Rzone 3 is reserved in a remaining unrecorded area and areas are reserved for VTSI and VTSM VOBS to define the "Invisible Rzone" as shown in FIG. 2(D). Further, after defining VTSTT VOBS by recording real data, VTSI BUP is defined as shown in FIG. 2(E), and VTSI and VTSM VOBS are reserved in the previously reserved areas as shown in FIG. 2(F). Thus, a next VTS is recorded as shown in FIG. 12(G). In the INC method, when a title is recorded next, unrecorded areas are defined similarly to sequentially record VTSs.

On the other hand, in an optical disk having VTSs sequentially recorded therein to define a real-time data recording area, there are defined areas for UDF and VMG by finalization by the INC method to define lead-in and lead-out zones as shown in FIG. 2(H). Thus, the optical disk is interchangeable with a read-only optical disk. It should be noted that in defining the UDF and VMG areas, UDF and VMG data are generated based on the data in the areas for the tiles VTSI and VTSM VOBS, and the data are recorded to the Rzone 1 which will thus be closed.

FIG. 3 shows a chart for explaining the ROW-based recording procedure. In the ROW method, a lead-in, UDF and VMG areas, and areas for recording the leading titles VTSI and VTSM VOBS are pre-reserved by padding as shown in FIG. 3(A). It should be noted that the "padding" refers to a process for reserving an area by recording there dummy data such as null (zero) or the like.

In the ROW method, when these areas are reserved, video data are sequentially recorded to define a VTSTT VOBS composed of real data as shown in FIG. 3(B). Upon completion of recording the real data under one title, a VTSI BUP area is defined, and padding is done for reserving recording areas for subsequent titles VTSI and VTSM VOBS, as shown in FIG. 3(B). Then, reservation of VTSI and VTSM VOBS areas for recording the real data will be repeated again from the beginning as shown in FIG. 3(C). Thus, one VTS is recorded in the optical disk by the ROW method.

In the ROW method, for continuously recording a next title, real data are recorded following a padded area composed of a preceding VTS to define VTSTT VOBS and VTSI BUP areas, and then padding is done for reserving subsequent titles VTSI and VTSM VOBS, as will be known from FIG. 3(D). Subsequently, areas are defined for titles VTSI and VTSM VOBS as shown in FIG. 3(E) to thereby record successive VTSs to the optical disk as shown in FIG. 3(F). In the ROW method, for successively recording titles, similar padding is done to record VTSs sequentially.

On the other hand, in an optical disk having such VTSs sequentially recorded therein to define a real-time data recording area, the ROW method defines UDF and VMG areas by finalization, and then lead-in and lead-out as shown in FIG. 3(G) to thereby establish interchangeability with a read-only optical disk.

Note that it is conceivable that such an optical disk is played in place of the magnetic tape in a portable video camcorder. In this case, since some conventional video camcorders can record moving pictures as well as still pictures, such an optical disk for use with the portable video camcorder should also desirably be capable of recording still pictures other than moving pictures.

Note that in the aforementioned format, no consideration is given to such a file recording and hence it will be necessary to hold still pictures or the like in a memory and record them to another recording medium.

Also note that it is desired that the content of a still picture file, among a variety of files thus recorded, by a standard DVD player which supports only the DVD video format.

OBJECT AND SUMMARY OF THE INVENTION

It is therefore an object of the present invention to overcome the above-mentioned drawbacks of the related art by providing a recording apparatus, a recording method, a recording program, and a recording medium having the recording program recorded therein, capable of recording also a file of still pictures other than moving pictures. The present invention has another object to provide a recording apparatus, a recording method, a recording program, and a recording medium having the recording program recorded therein, capable of enabling checking, by a standard recording apparatus, the content of a recorded file.

The above object can be attained by providing a recording apparatus which will be appended later, in which a control means converts the format in which a file and management information for the file are recorded to a program area according to the attribute of the file.

In the above recording apparatus according to the present invention, the control means is instructed by the user to provide such a system control as to convert, by a format converting means, a specific format in which the file is recorded in the recording medium and to record the file together with the management information to the recording medium, which will be appended later.

In the above recording apparatus, the control means can convert the format in which the file and the management information for the file are recorded to the program area according to the attribute of the file to record a file of moving pictures for example in the DVD video format and record a file of still pictures other than moving pictures reproducibly without any influence on the reproduction in the DVD video format. Thus, it is possible to record any file of still pictures other than moving pictures as well.

In the above recording medium, the control means is instructed by the user to provide such a system control as to convert, by the format converting means, the specific format in which the file is recorded in the recording medium and record the file along with the management information to the recording medium, whereby a file of still pictures not supported by the DVD video format for example can be converted in format to form a part of the moving pictures. Thus, the content of the file can be checked by a standard recording apparatus destined for reproducing only moving picture files.

Also the above object can be attained by providing a recording method which will be appended later, in which the format in which a file and management information for the file are recorded to a program area is converted according to the attribute of the file.

In the above recording method, under an instruction given by the user, the file recorded in a specific format to the recording medium is read in reproducing step, and the file read in the reproducing step is converted in format in format converting step to record the file along with the management information to the recording medium, which will be appended later.

Also the above object can be attained by providing a recording program which will be appended later, in which the format in which a file and management information for the file are recorded to a program area is converted according to the attribute of the file.

In the above recording program, under an instruction given by the user, the file recorded in a specific format to the recording medium is read in reproducing step, and the file read in the reproducing step is converted in format in format converting step to record the file along with the management information to the recording medium, which will be appended later.

Also the above object can be attained by providing a recording medium having the recording program recorded therein, which will be appended later, in which the format in which a file and management information for the file are recorded to a program area is converted according to the attribute of the file.

In the above recording medium, under an instruction given by the user, the recording program is such that the file recorded in a specific format to the data recording medium is read in reproducing step, and the file read in the reproducing step is converted in format in format converting step to record the file along with the management information to the data recording medium, which will be appended later.

There can be provided an optical disk recording method, a recording program and recording medium having the recording program recorded therein, capable of recording a file of still pictures other than moving pictures.

There can be provided a recording method, a recording program and recording medium having the recording program recorded therein, capable of the content of a file recorded as above by means of a standard recording apparatus as well.

These objects and other objects, features and advantages of the present invention will become more apparent from the following detailed description of the preferred embodiments of the present invention when taken in conjunction with the accompanying drawings.

BRIEF DESCRIPTION OF THE DRAWINGS

FIGS. 1(A) to (C) explain the DVD video format;
FIGS. 2(A) to (H) explain the INC-based recording;
FIGS. 3(A) to (G) explain the ROW-based recording;
FIGS. 4(A) to (K) explain recording in a first embodiment of the optical disk drive according to the present invention;
FIGS. 7(A) to (D) explain intermediate management information;
FIGS. 9(A) to (H) explain the ROW-based recording in the optical disk drive shown in FIG. 5.

DETAILED DESCRIPTION OF THE PREFERRED EMBODIMENTS

The embodiments of the present invention will be described in detail below with reference to the accompanying drawings:

(1) First Embodiment (1-1) Construction of the First Embodiment

Figure 5:
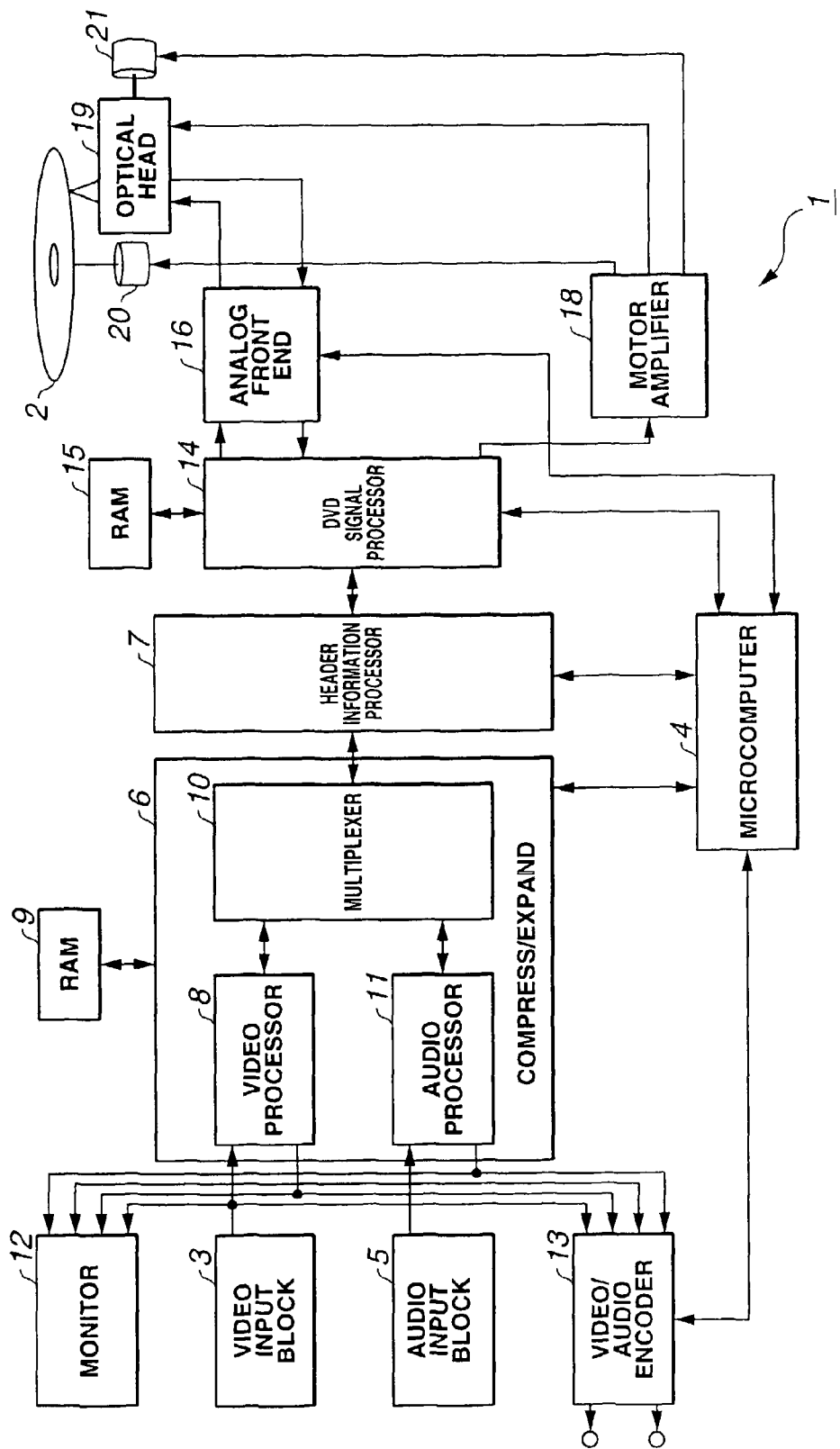
FIG. 5 is a block diagram of the optical disk drive in FIG. 4.

FIG. 5 is a block diagram of the first embodiment of the optical disk drive according to the present invention. The optical disk drive is generally indicated with a reference 1. This optical disk drive 1 is a portable video recorder designed to record picked up pictures to an optical disk 2 which is a DVD.

More particularly, the optical disk drive 1 includes a video input block 3 which makes analog-digital conversion of video signals captured by picture pickup means (not shown) or video signals supplied from an external apparatus to provide video data. It should be noted that a plurality of pickup means incorporated in the optical disk drive 1 is controlled by a microcomputer 4 also included in the optical disk drive 1 to provide results of imaging composed of moving pictures or still pictures. Thus, the video input block 3 operates in response to the control by the microcomputer 4 of the pickup means to selectively receive either video data composed of moving picture or still picture data.

The optical disk drive 1 further includes an audio input block 5 which makes analog-digital conversion of audio signals picked up by a microphone or audio signals supplied from outside to produce audio data.

The optical disk drive 1 also includes a compress/expand block 6 whose mode of operation is changed under the control of the microcomputer 4 to process data for recording or reproducing. More specifically, for recording video and audio data supplied from the video input block 3 and audio input block 5, respectively, the compress/expand block 6 will use a random access memory (RAM) 9 to multiplex the video and audio data by compression and supply the data to a head information processor 7. On the contrary, for reproduction of the video and audio data from the optical disk 2, the compress/expand block 6 will also use the RAM 9 to break the data supplied from the header information processor 7 into video and audio data, then expand the video and audio data, respectively, and output the expanded data.

More particularly, for data recording, a video processor 8 included in the compress/expand block 6 is controlled by the microcomputer 4 to compress video data supplied from the video input block 3, and outputs the compressed data. At this time, in case the video data is moving picture data, the compress/expand block 6 will take the MPEG-2 format for compression of the video data, and in case the video data is composed of still pictures, the compress/expand block 6 will compress the data in the JPEG (Joint Photographic Coding Experts Group) format, and output the compressed data. Also, for data reproduction, the video processor 8 will expand video data output from a multiplexer 10 according to the format, MPEG-2 or JPEG, in which the data has been compressed, and output the expanded data.

For data recording, an audio processor 11 included in the compress/expand block 6 will compress audio data output from the audio input block 5 in an MPEG format, Dolby audio format or a linear PCM format, and output the compressed data. On the contrary, for data reproduction, the audio processor 11 will expand audio data supplied from the multiplexer 10 and output the expanded data.

For data recording, the multiplexer 10 makes time-division multiplexing of video data output from the video processor 8 and audio data output from the audio processor 11, and outputs the multiplexed data to the header information processor 7. On the contrary, for data reproduction, the multiplexer 10 will break the time-division multiplexed data output from the head information processor 7 into video and audio data, and supply these data to the video processor 8 and audio processor 11, respectively.

The optical disk driver 1 also includes a monitor block 12 composed of a display mechanism to monitor video data supplied from the video input block 3, audio data supplied from the audio input block 5 or video data and audio data supplied from the compress/expand block 6, and an audio processing mechanism. Thus, the optical disk drive 1 according to the present invention can monitor captured pictures and sounds and results of data reproduction.

The optical disk drive 1 also includes a video/audio encoder 13 which compresses video and audio data supplied from the video and audio input blocks 3 and 5, respectively, or video and audio data supplied from the compress/expand block 6 in predetermined formats, respectively, and outputs the data to the external apparatus. Thus, the optical disk drive 1 according to the present invention enables to monitor captured pictures and sounds and results of data reproduction on the external apparatus.

For data recording, the header information processor 7 is supplied with time-division multiplexed data supplied from the compress/expand block 6 and adds, to the time-division multiplexed data, header information unique to a DVD, header information or the like on an extension file which will be described in detail later, under the control of the microcomputer 4, and outputs the data. Also, according to information supplied from the microcomputer 4, the header information processor 7 will produce data such as UDF, VMG, VTSI, etc. and output these data to a DVD signal processor 14. Also, for data reproduction, the header information processor 7 will separate, from output data from the DVD signal processor 14, head information having been added at the time of recording and output it to the compress/expand block 6, and inform the microcomputer 4 of the separated header information. It should be noted here that the "extension file" is a file not defined in the DVD video format standardized for the optical disk 2 and in this embodiment, a still picture format is applied as the extension file.

For data recording, the DVD signal processor 14 will use a random access memory 15 to generate an error correction code from data output from the header information processor 7 and add the error correction code to the output data. Also, the DVD signal processor 14 makes scrambling, 8/16 modulation and the like and outputs a data string composed of the processing results as a serial data string to an analog front end block 16.

On the contrary, for data reproduction, the DVD signal processor 14 will make error correction, descrambling and decoding of the output data from the analog front end block 16, namely, process the output data in an reverse order to the order in the data recording procedure, and output the results of such processes to the header information processor 7. Also, the DVD signal processor 14 make digital-analog conversion of drive information such as spindle control, tracking control, focus control and thread control data supplied from the microcomputer 4 to provide such drive signals and output the drive signals to a motor amplifier 18.

The analog front end block 16 generates a light amount control signal for a laser bean to be emitted from an optical head 19 to the optical disk 2, and outputs the control signal. For data reproduction, the analog front end block 16 will keep, according to the light amount control signal, the amount of laser beam projected onto the optical disk 2 from the optical head 19 at a constant value for data reading. On the contrary, for data recording, the analog front end block 16 will change the level of the light amount control signal according to the output data from the DVD signal processor 14, to thereby elevate the amount of laser beam intermittently from the value for data reproduction to a value for data recording according to the output data from the DVD signal processor 14.

Also, the analog front end block 16 amplifies and processes a result of detection of a return light supplied from the optical head 19 to generate a reproduced signal whose level varies correspondingly to a train of pits formed on the optical disk 2, and processes the reproduced signal for binary differentiation to yield reproduced data which will be supplied to the DVD signal processor 14. With the above processing of the result of return light detection, the analog front end block 16 will generate a tracking error signal and focus error signal of which the levels vary correspondingly to magnitudes of tracking error and focus error, respectively, and output these signals in the form of digital signal to the microcomputer 4.

The motor amplifier 18 is supplied with the drive signals from the DVD signal processor 14, and drives mechanisms corresponding to the drive signals. More specifically, the motor amplifier 18 drives to rotate a spindle motor 20 and thread moor 21 with ones, for spindle control and thread control, of these drive signals. Also, the motor amplifier 18 will drive an actuator installed in the optical head 19 with the drive signals for tracking control and focus control, respectively.

The spindle motor 20 chucks the optical disk 2 and drives to rotate the latter at a predetermined velocity. The thread motor 21 makes the optical head 19 movable radially of the optical disk 2.

Supplied with the light amount control signal from the analog front end block 16, the optical head 19 will emit a laser beam from a semiconductor laser incorporated therein, and focus the laser beam on the information recording area of the optical disk 2 through an objective lens. Also, a return light, namely, a reflected part of the laser beam projected on the optical disk 2 is guided to a predetermined photodetector element of the optical head 19 through the objective lens, and the result of light detection is supplied to the analog front end block 16. The objective lens of the optical head 19 is movable by the actuator driven with the tracking and focus control drive signals to have the tracking and focus thereof controlled. Also, the amount of laser beam is intermittently elevated according to the light amount control signal, whereby the information recording area of the optical disk 2 is locally elevated in temperature to record desired data there.

The microcomputer 4 is provided as a system controller for the optical disk drive 1. By executing a processing program pre-installed in the optical disk drive 1, supplied with signals of operations made by the user at a control panel (not shown) or supplied with various signals detected by the analog front end block 16, the microcomputer 4 controls the operation of each of the component blocks. More specifically, the microcomputer 4 will be supplied with a tracking error signal and focus error signal detected by the analog front end block 16 to generate tracking and focus control drive information, convert these signals by the DVD signal processor 14 into analog signals and supply the analog signals to the motor amplifier 18 which in turn will control the tracking and focus of the optical head 19. Also, supplied with the header information detected by the header information processor 7, the microcomputer 4 will detect a laser beam-projected position, generates thread control drive information from the result of detection and supply the information to the DVD information processor 14, to thereby perform a seek and the like. Similarly, the microcomputer 4 will make a performance for spindle control.

Figure 6:
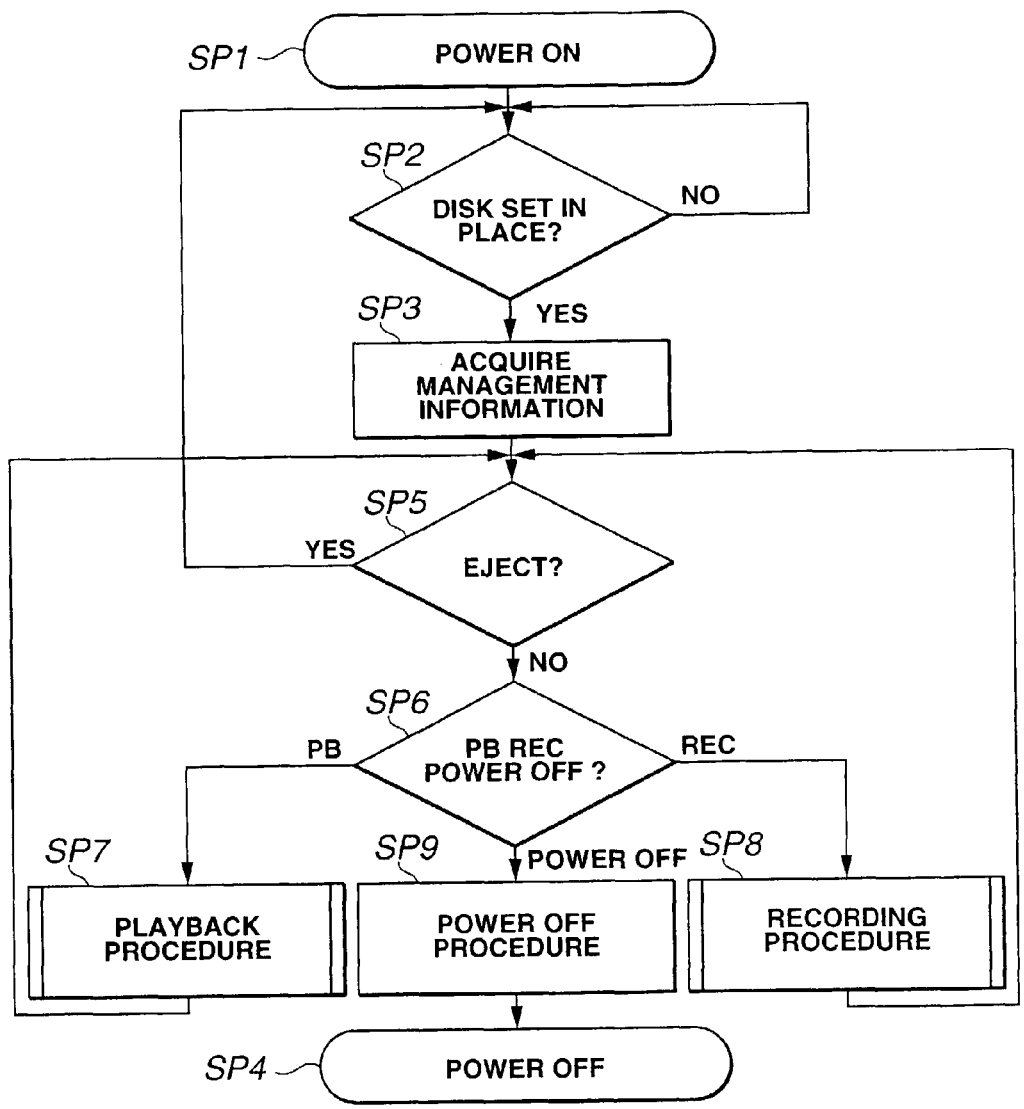
FIG. 6 shows a flow of operations made in the recording and reproducing procedures performed under the control of a microcomputer in the optical disk drive in FIG. 5.

The basic operations of the microcomputer 4, directed to the optical disk 2, have been described in the foregoing. Here will be described with reference to the flow chart in FIG. 6 operations that will be made by the microcomputer 4 for data read or write after the optical disk drive 1 is turned on. In step SP1, the optical disk drive 1 is turned on. Then the microcomputer 4 goes from step SP1 to SP2 where it will judge based on the result of detection of the optical disk 2 from a detection mechanism (not shown) whether the optical disk 2 is set in place in the optical disk drive 1. If the result of judgment in step SP2 is negative (no optical disk 2 is set in place), the microcomputer 4 will repeat the operation in step SP2. On the contrary, when the optical disk drive 1 has been turned on with the optical disk 2 loaded therein or when the optical disk 2 has been loaded after the optical disk drive 1 is turned on, namely, when the above result of judgment is affirmative (the optical disk 2 is set in place), the microcomputer 4 will go from step SP2 to SP3. It should be noted that if the optical disk drive 1 is turned off when the microcomputer 4 is repeating the operation in step SP2, the microcomputer 4 will go directly to step SP4 where it will exit this reproducing or recording procedure (power off).

In step SP3, the microcomputer 4 drives the thread motor 21 to move the optical head 19 to the innermost circumference of the optical disk 2, and is supplied with the result of reading the innermost-circumferential area from the DVD signal processor 14. In case the optical disk 2 is a finalized one, the microcomputer 4 will acquire data in the VMG area from the DVD signal processor 14. On the contrary, if the optical disk 2 is not any finalized one, the microcomputer 4 will acquire information in the RMA area from the DVD information processor 14. When the microcomputer 4 determines based on the information in the RMA area that data has already been recorded in the real-time data recording area of the optical disk 2, it searches the optical disk 2 for VTSI and VTSTT VOBS data in each VTS. Thus, as in an optical disk drive to record and reproduce an ordinary DVD, the microcomputer 4 will acquire management information required for data write to, and read from, the optical disk 2.

In this procedure, the microcomputer 4 acquires the data in the VMG area and data in the UDF area as well. When reading the real-time data recording area, the microcomputer 4 will also acquire intermediate management information, if any, found recorded in the real-time data recording area. Thus, the microcomputer 4 acquire also management information for an extension file not defined in the DVD video format to enable reading of the extension file from the optical disk 2. The microcomputer 4 will record and hold a series of thus acquired management information in a built-in memory.

Next, the microcomputer 4 goes to step SP5 where it will judge whether it is instructed to eject the optical disk 2. When the result of judgment is affirmative, the microcomputer 4 will instruct a loading mechanism (not shown) to eject the optical disk 2 and then go back to step SP2.

On the contrary, when supplied with an instruction for other than the ejection of the optical disk 2 from the user, the microcomputer 4 goes from step SP5 to SP6 where it will judge which the supplied user's instruction is, recording (REC), reproduction (PB) or power off. When the user's instruction is "PB (reproduction)", the microcomputer 4 goes from step SP6 to SP7 where it will proceed to reproduction of a file from the optical disk 2 and then return to step SP5.

When the user's instruction is "REC (recording)", the microcomputer 4 goes from step SP6 to SP8 where it will proceed to recording of moving or still pictures to the optical disk 2 and then go back to step SP5. It is important to note that when the optical disk 2 has UDF and VMG areas defined therein through the so-called finalization, the microcomputer 4 will skip over the recording procedure to step SP5 since the optical disk 2 has been processed against data recording. Also, even in case the optical disk 2 is a DVD-RW which is finalized but erasable, the microcomputer 4 will erase the data existent in the optical disk 2 with acknowledgment from the user and proceed to data recording.

When the user's instruction is "Power off", the microcomputer 4 goes from step SP6 to SP9 where it will proceed to turn off the power to the optical disk drive 1 and then return to step SP4 where it will exit this recording or reproducing procedure.

In the recording one of the above procedures, when the optical disk 2 is DVD-R, the microcomputer 4 will adopt the INC method to record a moving or still picture file to the optical disk 2. On the other hand, when the optical disk is DVD-RW or DVD-RAM, the microcomputer 4 will adopt the ROW method to record a moving or still picture file to the optical disk 2.

FIG. 4 is a chart for explanation of the recording of a moving picture file and still picture file to an optical disk 2 having no files yet recorded therein, namely, a virgin disk, by the INC method. Updating RMA information acquired from the optical disk 2 and held in the built-in memory, the microcomputer 4 reserves Rzone1 as shown in FIG. 4(A).

For recording moving picture files, the microcomputer 4 will similarly reserve Rzone2 and Invisible Rzone as shown in FIG. 4(A) by updating the RMA information, and record video data composed of real data sequentially to the Invisible Rzone to generate VTSTT VOBS. Also, when instructed by the user to stop recording, the microcomputer 4 will generate VTSI BUP as shown in FIG. 4(B), and generate VTSI and VTSM VOBS to generate one VTS as shown in FIG. 4(C). According to the VTS thus generated, the microcomputer 4 will hold management information for the data into the memory thereof and update the RMA information held in the memory.

For recording a moving picture file next, the microcomputer 4 will similarly update the RMA information held in the memory to reserve Rzone2 and Invisible Rzone, then sequentially record real data to the Invisible Rzone, and also generate VTSTT VOBS and VTSI BUP, and also VTSI and VTSM VOBS. Correspondingly to this data generation, the microcomputer 4 will record management information for them to the memory and update the RMA information held in the memory.

When adopting the INC method to record moving pictures, the microcomputer 4 will record titles sequentially as in the conventional INC method. Also, when the optical disk 2 not yet finalized is loaded and data is to be additionally recorded to the optical disk 2, the microcomputer 4 will perform the similar operations with the RMA data acquired in step SP2 in FIG. 6 and held in the memory starting at the end of an existent title, thereby additionally recording moving pictures which are results of imaging.

On the other hand, in the process of finalizing the optical disk 2, the microcomputer 4 will generate UDF and VMG for Rzone1 from the management information generated as above and held in the memory to define a lead-in zone and lead-out zone. When having additionally recorded data to the optical disk 2 not yet finalized, the microcomputer 4 will of course generate UDF and VMG data for the existent titles in the optical disk 2 according to VTSI and VTSM VOBS acquired in step SP3 in FIG. 6.

With the above operations, the optical disk drive 1 record a moving picture file in the DVD video format as in the conventional INC method.

When instructed by the user to record still pictures, the microcomputer 4 will initially reserve Invisible Rzone by updating RMA held in the memory thereof to sequentially record still picture files being extension files (indicated with a reference EF in FIG. 4) as shown in FIG. 4(E). Further, correspondingly to the recording of the still picture files EF and hold the information in the built-in memory thereof, the microcomputer 4 sequentially generates intermediate management information for provisional management of the still picture files until the finalization.

Furthermore, after having recorded a desired number of still picture files and when given a user's instruction for ending the recording of the still picture files, the microcomputer 4 will close Invisible Rzone by updating the RMA held in the memory and reserve Rzone3 in an area next to the still picture file as shown in FIG. 4(F). Also, the microcomputer 4 will convert the intermediate management information held in the memory into a format for recording to the optical disk 2 and record the intermediate management information to Rzone 3 as shown in FIG. 4(G).

Note that the intermediate management information is necessary for reading extension files, it is composed of attribute extensions, addresses and sizes of the extension files, date and time when the extension files were recorded to the optical disk 2, and it is collectively recorded for each of the attributes of successively recorded extension files, as shown in FIG. 7. That is, as shown in FIG. 7(B), the intermediate management information is composed of a header, and file management information DJ, DM7 and DM4 for the attributes. For example, in case three JPEG-formatted files FJ1, FJ2 and FJ3 have been recorded under the instruction from the user, then two MPEG-7-formatted files FM71 and FM72 have been recorded and further two MPEG-4-formatted files FM41 and FM42 have been recorded, as shown in FIG. 7(A), the header stated in the intermediate management information indicates that these three types of files are recorded in the optical disk 2 and also the addresses of subsequent file management information DJ, DM7 and DM4. Note that the references "DJ", "DM7" and "DM4" indicate file management information defined in JPEG, MPEG7 and MPEG4, respectively.

The file management information DJ for each attribute is recorded for each of the management information DFJ1, DFJ2 and DFJ3 in each file as shown in FIG. 7(C), and corresponding extension file attribute, address ADDR, size, data and time of recording, etc. are allocated to the management information DFJ1 on each file, as shown in FIG. 7(D).

Note that in this embodiment, when the JPEG-based still picture file is applied as an extension file to the optical drive 1, only the file management information DJ as shown in FIG. 7(B) will be generated for each attribute in the optical disk 2 to which data have been recorded by the optical disk drive 1.

Thus, even when any other file than moving picture file is recorded to the optical disk 2, the microcomputer 4 will record the file and management information for the file in combination to the program area on the optical disk 2. Also, at this time, when the file going to be recorded to the optical disk 2 is a moving picture tile, he microcomputer 4 controls so that the management information, file and backup information for the management information will sequentially be recorded. When the file going to be recorded to the optical disk 2 is a still picture file other than a moving picture file, the microcomputer 4 controls so that the file and management information for the file will be recorded sequentially, whereby the recording format for the management information is converted according to the attribute of the file in consideration.

As above, when the intermediate management information DK is thus recorded, the microcomputer 4 will store the intermediate management information DK into the built-in memory thereof and hold it there. Also, when the microcomputer 4 records intermediate management information DK in this way and then records a still picture file again, it will similarly record extension files sequentially and record the intermediate management information DK under a user's instruction to end the recording.

On the other hand, for recording a moving picture file next, the microcomputer 4 will reserve Zone and Invisible Rzone as shown in FIG. 4(H) to define VTSTT VOBS and VTSI BUP, and also VTSI and VTSM VOBS, as shown in FIG. 4(I). Thus, the microcomputer 4 will record one VTS next to the intermediate management information DK as shown in FIG. 4(J)).

With the above operations, the optical disk drive 1 records a combination of a still picture file not in the DVD video format and the management information for the still picture file along with a moving picture file in the DVD video format. Thus, in the conventional optical disk drive which supports only the DVD video format, when the thus recorded optical disk 2 is searched for a real-time data recording area according to the RMA, only VTSI and VTSTT VOBS, being VTS management information, are detected, and an extension file of still pictures, not defined in any way, and intermediate management information for the extension file will not be recognized as any significant file. On the other hand, in an optical disk drive which supports the above type of extension file, the VTS management information as well as an extension file of still pictures and intermediate management information for the extension file will be recognized.

Thus, the microcomputer 4 will record extension files without influence on the reproduction of moving pictures in the conventional optical disk drive.

Thus, when instructed from the user to finalize the optical disk 2 having the extension files recorded therein as above, the microcomputer 4 will generate UDF data from the management information (VTSI and VTSTT VOBS) for all the titles having thus been generated with reference to the management table and intermediate management information for all the extension files, and record the UDF data to the optical disk 2, as shown in FIG. 4(K). Also, the microcomputer 4 will generate VMG data from only the management information (VTSI and VTSTT VOBS) for all the titles, and record it to the optical disk 2. It is important to note that the UDF and VMG data are generated according to the intermediate management information held in the memory or the like. Also, having recorded the UDF and VMG in this way, the microcomputer 4 will define lead-in and lead-out zones. It should also be noted that the microcomputer 4 will record the UDF and VMG data, define the lead-in and lead-out zones and record the intermediate management information, all by outputting the corresponding data to the DVD signal processor 14.

Figure 8:
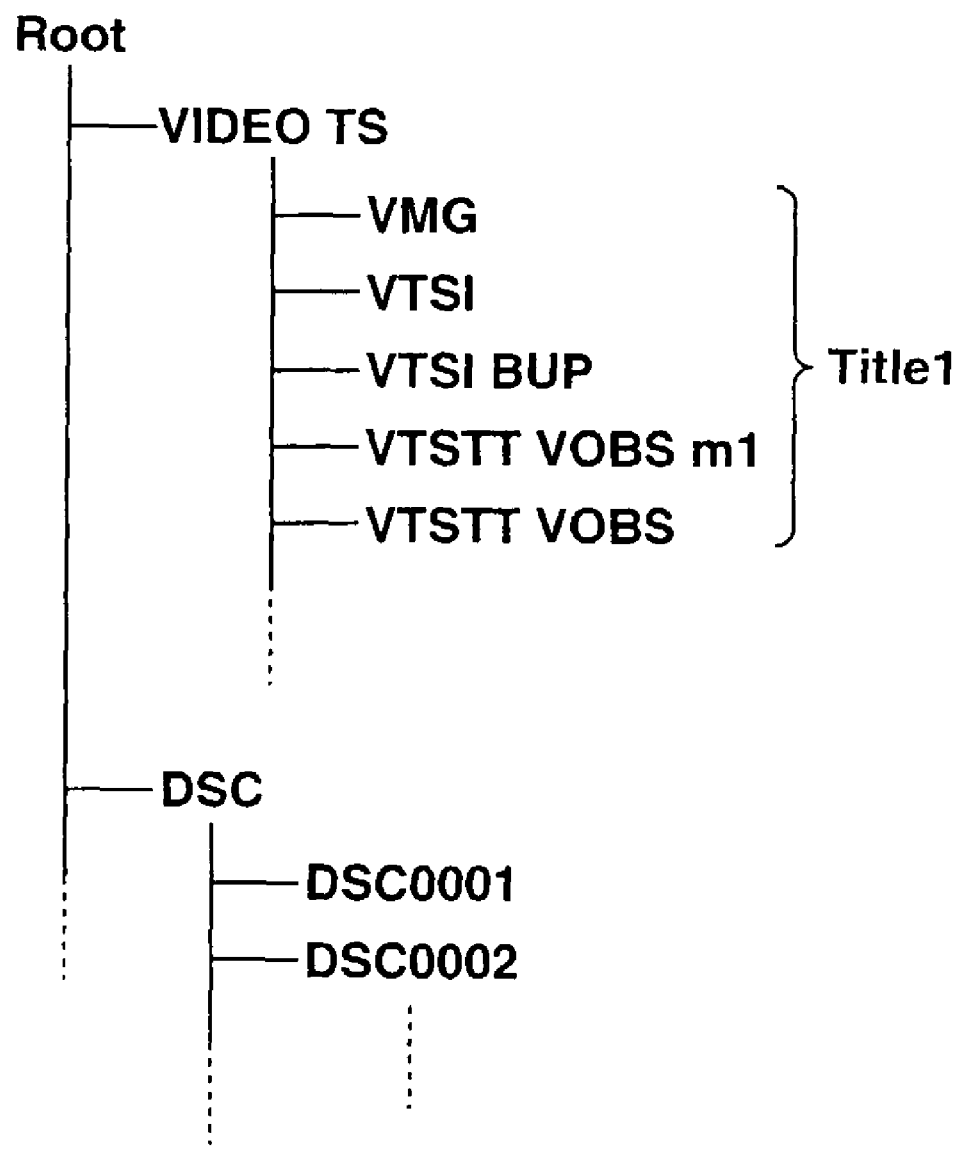
FIG. 8 explains the directory structure on the optical disk.

Therefore, in this embodiment, the UDF data for management of the computer will include management information by which also an extension file can be recognized and accessed but the VMG data for management of DVD reproduction will include no extension file-related information. As shown in FIG. 8, the microcomputer 4 will reproduce the UDF data for management of the computer to generate UDF in a separate folder in the same hierarchical layer as a DVD title so that only extension files will be displayed. For the intermediate management information DK having been described above with reference to FIG. 7, the microcomputer 4 will generate UDF with no file name, address information such as an address, etc. being stated. It should be noted that the microcomputer 4 will of course generate the UDF so that each extension file can be accessed similarly to titles VTSI, VTSM VOBS, etc. Thus, in this embodiment, when the optical disk 2 is reproduced by a computer, a file of provisional intermediate management information which is meaningless in reproduction of the optical disk 2 by the computer is made invisible from the user so that the optical disk drive 1 can accordingly be improved in operability.

Thus, the conventional optical disk drive for DVD can only read moving picture files recorded in the optical disk 2 by recording VMG data to the optical disk 2. On the contrary, in the optical disk drive 1, the microcomputer 4 acquires UDF and VMG data in step SP3 in FIG. 6 to provide a system control for access to each of extension files based on the UDF data, to thereby reproduce the extension files as well. It should be noted that in FIG. 8, "Root" is a root directory, "VIDEO TS" is a moving picture folder and "DSC" is an extension file folder. Also, "DSC0001" and "DSC0002" are extension files, respectively.

FIG. 9 is a chart for explaining the ROW-based recording in contact with the INC-based recording shown in FIG. 4. In case the optical disk 2 is DVD-RW or DVD-RAM, the microcomputer 4 adopts the ROW method to record a moving picture file and extension file. More particularly, to record a moving picture file, the microcomputer 4 reserves an area by padding through the RMA management as in the conventional system as shown in FIG. 9(A), records VTSTT VOBS and VTSI BUP there, reserves a next area by padding as shown in FIG. 9(B) and defines VTSI and VTSM VOBS again at the beginning as shown in FIG. 9(C). Thus, the microcomputer 4 will record one VTS to the optical disk by the ROW method.

For recording of a moving picture file next, the microcomputer 4 will repeat similar operations to the above to record titles sequentially as in the conventional system and finalize the optical disk.

On the other hand, for recording an extension file and in case an area has been reserved by padding, the microcomputer 4 will record an extension file EF to the area sequentially starting at the top of the area, record intermediate management information DK, and reserve a next title recording area by padding, as shown in FIG. 9(D). It should be noted that recording of the extension file EF and intermediate management information DK is the same as in the INC method except that they are recorded at the top of the recorded area reserved by padding and the next title recording area is reserved by padding.

For recording an extension file next, the microcomputer 4 will repeat such recording of the extension file EF and intermediate management information DK and reservation of an area by padding. For recording a moving picture file next to the extension file, the microcomputer 4 will record VTSTT VOBS and VTSI BUP in an area next to the padded area, reserve a next area by padding and define VTSI and VTSM VOBS again at the beginning as in recording of a moving picture file next to a moving picture file, as shown in FIGS. 9(E) and 9(F). Thus, one VTS is recorded to the optical disk as shown in FIG. 9(G).

Thus, the optical disk drive 1 can record a moving picture file in the DVD video format and also a combination of a still picture file and intermediate management information for the file not in the DVD video format, with no influence on the reproduction of the moving picture file in the conventional optical disk drive.

Note that to record the extension files as above, the microcomputer 4 will record and hold management information for each of the extension files in its built-in memory, as having previously been described with reference to FIG. 4.

On the other hand, for finalizing the optical disk 2, the microcomputer 4 will generate UDF and VMG data, record them into an area reserved by padding to generate UDF and VMG and define a lead-in zone and lead-out zone, as in the INC method. Thus, even by the ROW method, the management information can be recorded so that moving and still picture files can be read by some computers from optical disks which support extension files, and only moving pictures can be read by some conventional DVD-oriented optical disk drives, as in the INC method.

Figure 10:
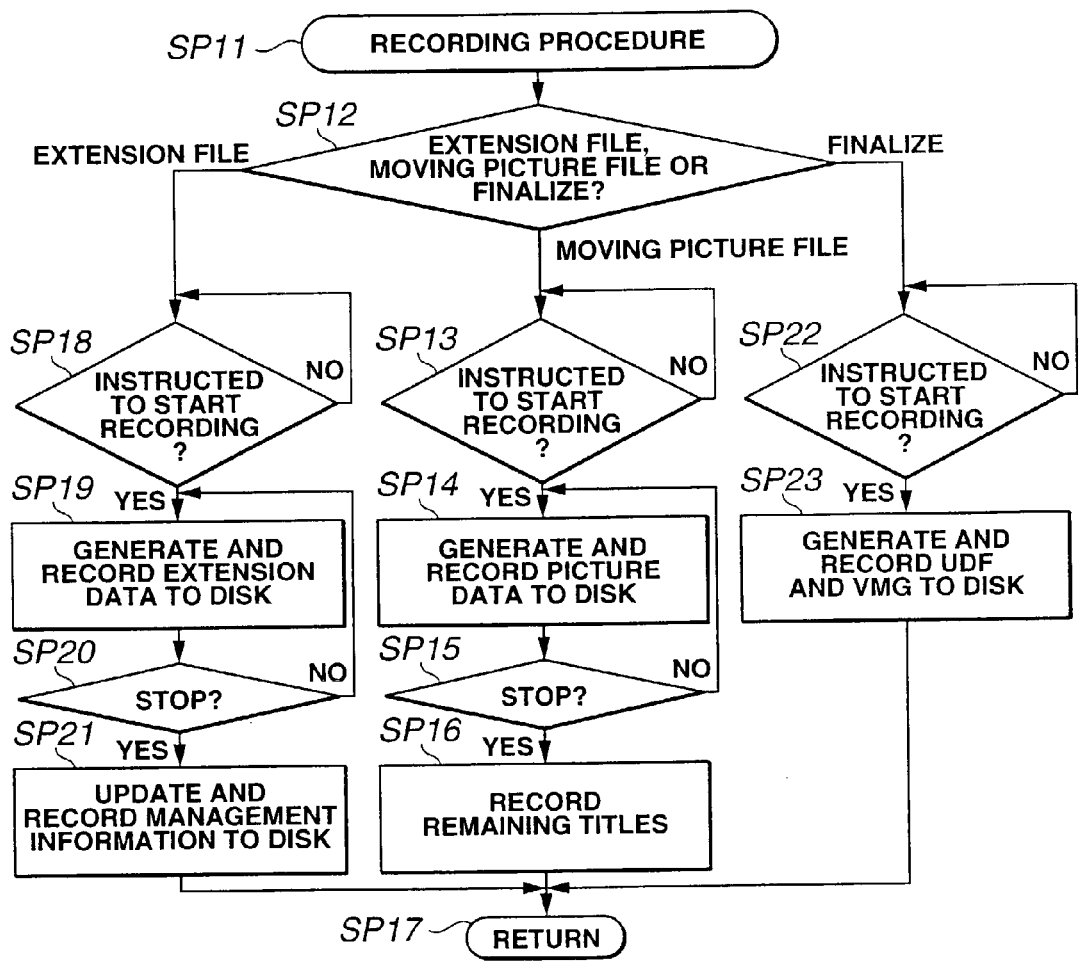
FIG. 10 shows a flow of operations made in the recording procedure in the optical disk drive shown in FIG. 5.

FIG. 10 shows a flow of operations in the recording procedure having been described above with reference to FIGS. 4 and 9. When this recording procedure is started, the microcomputer 4 goes from step SP11 to SP12 where it will judge which the user has instructed to do, recording of a moving picture file, recording of a still picture file or finalization.

When the user instruction is to record a moving picture file, the microcomputer 4 goes from step SP12 to SP13 where it will judge whether the user has instructed to start the recording. If the result of judgment in step SP13 is negative, the microcomputer 4 will repeat the operation in step SP13. If the above result of judgment is affirmative, the microcomputer 4 goes from step SP13 to SP14 where it will record real data as having been described above with reference to FIGS. 4 and 9. Further, the microcomputer 4 goes to step SP15 where it will judge whether the user has instructed to stop the recording. If the result of judgment in step SP15 is negative, the microcomputer 4 will go back to step SP14. This, the microcomputer 4 repeats the operations in steps SP14, SP15 and again in SP14, thereby sequentially recording real data. When the above result of judgment is affirmative, the microcomputer 4 will complete the recording of VTSTT VOBS data with exiting the recording of real data.

Next, the microcomputer 4 goes to step SP16 where it will sequentially define VTSI BUP, VTSI and VTSM VOBS areas in the optical disk 2, thereby recording one VTS, and then goes to step SP17 where it will exit this recording procedure.

On the other hand, when the user's instruction is to record a still picture file, the microcomputer 4 goes from step SP12 to SP18 where it will judge whether the user has instructed to start the recording. If the result of judgment in step SP18 is negative, the microcomputer 4 will repeat the operation in step SP18. On the contrary, when the above result of judgment is affirmative, the microcomputer 4 goes from step SP18 to SP19 where it will record an extension file for the still picture file as having been described above with reference to FIGS. 4 and 9. Further, the microcomputer 4 goes to step SP20 where it will judge whether the user has instructed to stop the recording. If the result of judgment in step SP20 is negative, the microcomputer 4 will go back to step SP19. Thus, the microcomputer 4 repeats the operations in steps SP19, SP20 and again in SP19 to sequentially record the still picture files. If the above result of judgement is affirmative, the microcomputer 4 terminates the recording of still picture files and goes to step SP21 where it will record intermediate management information, and goes to step SP17 where it will exit this recording procedure.

When the user's instruction is to record data related to finalization of the optical disk 2, the microcomputer 4 goes from step SP12 to SP22 where it will judge whether the user has instructed to start the recording. If the result of judgment in step SP22 is negative, the microcomputer 4 will repeat the operation in step SP22. When the above result of judgment is affirmative, the microcomputer 4 goes from step SP22 to SP23 where it will finalize the optical disk 2 as having been described above with reference to FIGS. 4 and 9, and then goes to step SP17 where it will exit this procedure.

Figure 11:
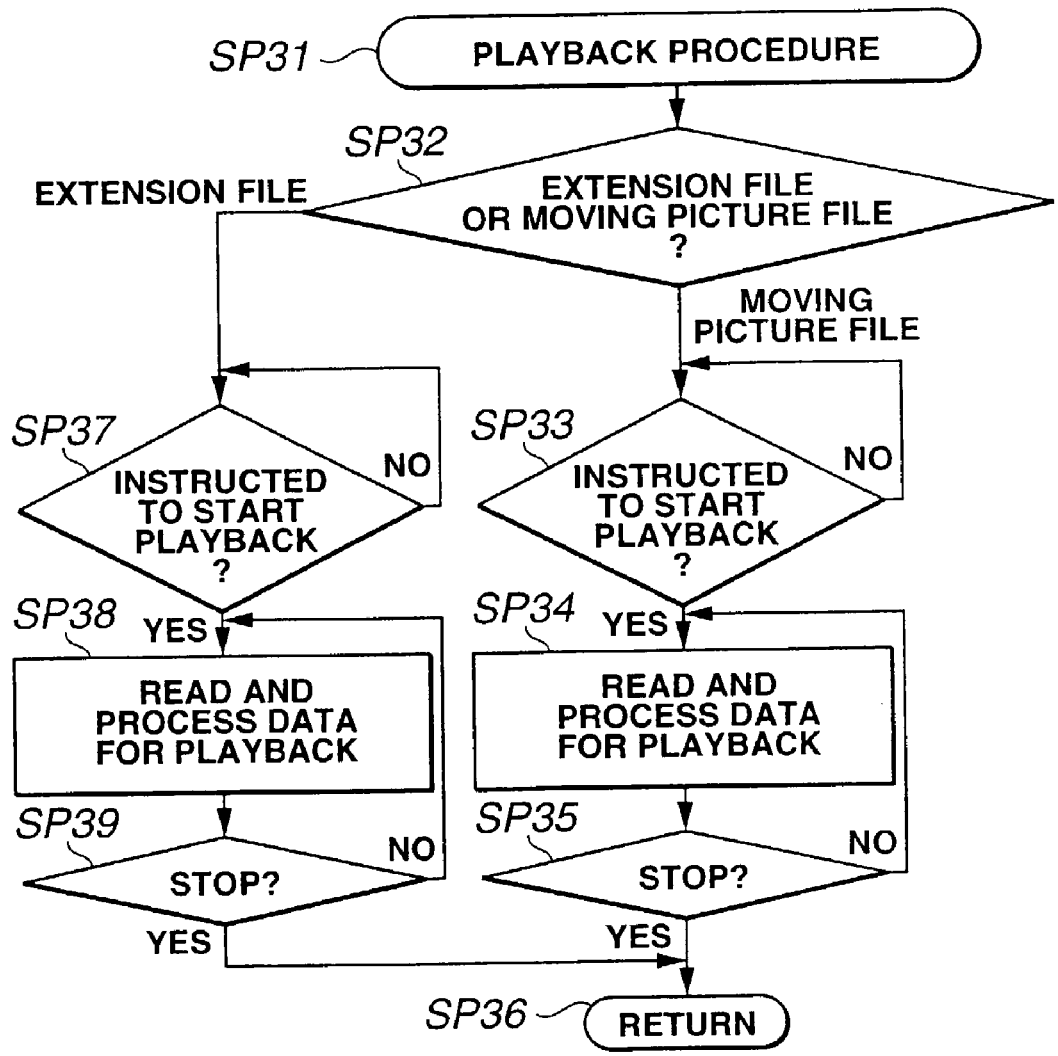
FIG. 11 shows a flow of operations made in the reproducing procedure in the optical disk drive shown in FIG. 5.

FIG. 11 shows a flow of operations included in the reproducing procedure shown in FIG. 4. When this reproducing procedure is started, the microcomputer 4 goes from step SP31 to SP32 where it will judge which the user has instructed to read, a moving picture file or a still picture file.

When the user's instruction is for reproduction of a moving picture file, the microcomputer 4 goes from step SP32 to SP33 where it will judge whether the user has instructed to start the reproduction. If the result of judgment is negative, the microcomputer 4 will repeat the operation in step SP33. When the above result of judgment is affirmative, the microcomputer 4 goes from step SP33 to SP 34 where it will provide a system control for reproducing a moving picture file designated by the user with reference to the management information held in the memory.

That is, when the optical disk 2 is a finalized one, the microcomputer 4 will detect the address of a file in consideration on the basis of the VMG data held in the built-in memory thereof, and instruct each of the components of the optical disk drive 1 to read the file from the address. On the other hand, in case the optical disk 2 is not any finalized one, the microcomputer 4 will detect the address of the file in consideration on the basis of titles VTSI and VTSTT VOBS held in the memory, and instruct each of the components of the optical disk drive 1 to read the file from the address.

After instructing the reproduction as above, the microcomputer 4 goes to step SP35 where it will judge whether the user has instructed to stop the reproduction. If the result of judgment in step SP35 is negative, the microcomputer 4 will return to step SP34. Thus, the microcomputer 4 repeats the operations in steps SP34, SP35 and again in SP34 to sequentially read moving picture files designed by the user. On the other hand, when the above result of judgment is affirmative, the microcomputer 4 will terminate the reproducing operation, and goes to step SP36 where it will exit the reproducing procedure.

On the other hand, in case the user's instruction is to read an extension file, the microcomputer 4 goes from step SP32 to SP 37 where it will judge whether the user has instructed to start the reproduction. If the result of judgment is negative, the microcomputer 4 will repeat the operation in step SP37. On the contrary, when the result of judgement is affirmative, the microcomputer 4 goes from step SP37 to SP38.

In case the optical disk 2 is a finalized one, the microcomputer 4 will detect the address of a file in consideration on the basis of the UDF data held in the memory thereof, and instruct each of the components of the optical disk drive 1 to read the file from the address. On the other hand, in case the optical disk 2 is not any finalized one, the microcomputer 4 will detect the address of the file in consideration on the basis of record of the intermediate management information held in the memory, and instruct each of the components of the optical disk drive 1 to read the file from the address.

After instructing the reproduction as above, the microcomputer 4 goes to step SF39 where it will judge whether the user has instructed to stop the reproduction. If the result of judgment in step SP 39 is negative, the microcomputer 4 will go back to step SP38. Thus, the microcomputer 4 repeats the operations in steps SP38, SP39 and again in SP38 to sequentially read still picture files designated by the user. On the contrary, if the above result of judgment is affirmative, the microcomputer 4 terminates the reproducing operation, and goes to step SP36 where it will exit the reproducing procedure.

Thus, in this embodiment, the microcomputer 4 provides a management information generating means for generating management information for a file to be recorded, and the DVD signal processor 14, random access memory 15, analog front end block 16, motor amplifier 18, optical head 19 and spindle motor 20 form together a recording means for recording the file in combination with the management information for the file to the program area on the optical disk 2. Also, the microcomputer 4 provides a control means for controlling the operations of the management information generating means and recording means, and it forms, together with the compress/expand block 6, header information processor 7, DVD signal processor 14, random access memory 15, analog front end block 16, motor amplifier 18, optical head 19 and spindle motor 20, a reproducing means for reading a file of each attribute recorded in the optical disk on the basis of the management information recorded in the optical disk 2 in combination with the file.

(1-2) Function of the First Embodiment

The optical disk drive 1 constructed as having been described above with reference to FIG. 5 functions as will be described herebelow:

When the optical disk 2 is loaded by the user into the optical disk drive 1 turned on or when the optical disk drive 1 is turned on with the optical disk 2 being loaded in the optical disk drive 1, the microcomputer 4 controls the DVD signal processor 14 and motor amplifier 18 to drive the thread motor 21 in order to move the optical head 19 toward the inner circumference of the optical disk 2. Further, a laser beam is projected from the optical head 19 to the optical disk 2. A return light is detected by the optical head 19 and is sequentially processed through the analog front end block 16 and microcomputer 4. The optical head 19 undergoes tracking control and focus control by the microcomputer 4 via the DVD signal processor 14 and motor amplifier 18. Also, the detected return light is processed by the DVD signal processor 14 to read data from the optical disk 2. In the optical disk drive 1, various kinds of information recorded along the inner circumference of the optical disk 2 are acquired by the microcomputer 4 through the above series of operations and held in the memory built in the microcomputer 4.

In case the optical disk 2 is a read-only optical disk formed by stamping or in case it is a finalized one having only moving picture files recorded therein, the microcomputer 4 will acquire VMG data recorded along the inner circumference of the optical disk 2 and which is management information for a DVD player through the above series of operations. Thus in the optical disk drive 1, when it is instructed by the user to reproduce the optical disk 2, the spindle motor 20 is driven according to the VMG data by means of the DVD signal processor 14 and motor amplifier 18 to move the optical head 19 to the address of a user-designated title (seek operation), and with the optical head 19 undergoing the tracking control and focus control on the basis of the detected return light, the detected return light is sequentially processed through the DVD signal processor 14, header information processor 7 and compress/expand block 6 to read video data composed of moving pictures. More particularly, a read signal being a result of return light detection and which varies in level correspondingly to pit trains on the optical disk 2 is processed by the analog front end block 16 to produce read data, and the read data is decoded, deinterleaved and error-corrected by the DVD signal processor 14. Also, the error-corrected read data is supplied to the header information processor 7 where the header is removed from the data and the microcomputer 4 is informed of the header. Further, the read signal is supplied to the compress/expand block 6 and broken by the multiplexer 10 into video and audio data. The video data is released by the video processor 8 from the MPEG-compressed state and displayed on the monitor 12 or supplied to an external apparatus via the video/audio encoder 13. On the other hand, the audio data is expanded by the audio processor 11 and then supplied to the monitor 12 for monitoring or supplied to the external apparatus via the video/audio encoder 13.

In case the optical disk 2 is a recordable virgin disk, however, when the optical disk 2 is loaded into the optical disk drive 1 or when the optical disk drive 1 is turned on, the microcomputer 4 will access the optical disk 2 to acquire RMA data from the latter. In the optical disk drive 1, when the user selects the moving picture capture mode and VMG in case the optical disk 2 is a DVD-R (as shown in FIG. 4), the microcomputer 4 will update the RMA data held in the memory thereof to reserve areas for UDF and VMG by reserving Rzone1. Also, in case the optical disk 2 is DVD-RW (as shown in FIG. 9), the microcomputer 4 will similarly update the RMA data to reserve areas for UDF and VMG and areas for VTSI and VTSM VOBS of a first VTS by padding.

When the user instructs to start the recording in this condition, video and audio data are sequentially supplied from the video input block 3 and audio input block 5 and the video data is compressed by the video processor 8 with the MPEG technique while the audio data is compressed by the audio processor 11. Further, the video and audio data thus compressed are multiplexed by the multiplexer 10 and then the multiplexed data has a header added thereto by the header information processor 7. In the DVD signal processor 14 provided downstream, the multiplexed data has an error correction code added thereto, and undergoes interleaving and encoding. According to the result of this data processing, the analog front end block 16 will set an amount of laser beam emitted from the optical head 19 to the optical disk 2. Thus, pits are sequentially formed on the optical disk 2 to sequentially record moving video data composed of moving pictures.

In the optical disk drive 1, when the user instructs to stop the recording, a series of operations in the compress/expand block 6 and the like is stopped by the microcomputer 4 to cease the recording of the video data and then the management information for the moving picture file thus recorded is recorded to the optical disk 2. Namely, in the optical disk drive 1, the microcomputer 4 will generate management information from the address, file size, recording date, etc. of the moving picture data, and supply the management information to the DVD signal processor 14 and record it to the optical disk 2 so that the management information will be recorded next to the video data, whereby VTSI BUP area is defined. Then, when the optical disk 2 is DVD-RW, areas for VTSI and VTSM VOBS of a next VTS are defined by padding, and the optical head 19 is caused to seek to areas for the existing VTSI and VTSM VOBS. Similar management information is supplied to the DVD signal processor 14 and recorded to the optical disk 2 to define the intended VTSI and VTSM VOBS areas.

In the optical disk drive 1, video data composed of moving pictures is recorded for one title. Thus, in the optical disk drive 1, for recording a moving picture file, management information and the file are recorded in the DVD video format in which management information composed of VTSI, management information composed of VTSM VOBS, moving picture file and management information composed of VTSI BUP are laid successively.

When the user then instructs to record moving pictures, the similar operations are repeated to sequentially record titles to the optical disk 2. In case an optical disk having such titles sequentially recorded therein as above and not yet finalized is loaded into the optical disk drive 1, the management information having been recorded in combination with the titles are initially acquired along with the RMA data by scanning the optical disk 2 with reference to the RMA data, and are held in the memory built in the microcomputer 4, and a title continuing from the end of a title detected through scanning of the optical disk 2.

In the optical disk drive 1, when titles are recorded to the optical disk 2 as above and the user instructs to finalize the optical disk 2, UDF and VMG data are generated according to the management information recorded in combination with the titles in the memory and recorded to the inner-circumferential area defined on the optical disk 2, and also the lead-in and lead-out zones are defined. Thus, this optical disk can be set up for reproduction by a DVD player which supports only the ordinary DVD format.

On the other hand, in case the user has selected the still picture recording mode, UDF and VMG areas will be defined in a virgin disk as in the recording of moving pictures by updating the RMA held in the memory and also padding. Also, in the optical disk drive, the mode of operation of the imaging means is switched to the still picture mode and the operation mode of the compress/expand block 6 is switched to the operation mode for a JPEG-based data compression.

When the user instructs to start the recording of still pictures in this condition, video data composed of still pictures supplied from the video input block 3 are compressed by the video processor 8 of the compress/expand block 6 into the JPEG format, and then multiplexed by the multiplexer 10 with audio data supplied from the audio processor 11. Thus, in the optical disk drive 1, the still pictures-composed video data, not any moving pictures-composed video data, are provided for recording and sequentially recorded to the optical disk 2 as in the recording of the moving pictures.

In this optical disk drive 1, for recording moving pictures, areas for VTSI and VTSM VOBS are initially defined for recording real data, but for recording still pictures, real data composed of the still pictures are recorded without reserving such areas. Also, when the user instructs to record still pictures, subsequent still pictures are recorded to the optical disk 2 as above. At each recording, the address of each file is recorded to the memory of the microcomputer 4.

In the optical disk drive 1, when the recording of still pictures is stopped by the user changing the mode of operation or otherwise with a desired number of still picture files having been recorded to the optical disk, the management information composed of addresses etc. held in the memory is recorded, as provisional intermediate management information intended for use until the finalization, in successive areas for the plurality of still picture files. Thus in the optical disk drive 1, for recording other files than any moving picture file, the files and management information for them will be recorded in the order of a file and management information, and a format for recording the files and management information is selected depending upon the attribute of the files to be recorded.

As above, the optical disk drive 1 can also record still picture files not defined in the DVD video format to the optical disk 2. Also, when the optical disk having the still picture files thus recorded therein is loaded into an optical disk drive which supports only the DVD video format, the management information having been recorded according to the DVD video format such as VTSI or the like is detected through a search made at the time of disk loading, and VTS is read based on the management information. Thus, the files of still pictures thus recorded and management information for the files will not possibly influence the reading of any moving pictures. Therefore, any ordinary DVD player can read a moving picture file from the optical disk having the moving picture file thus recorded therein.

On the contrary, an optical disk drive which also supports other than the moving picture files can read still picture files as well. That is, in the optical disk drive 1 having the aforementioned optical disk 2 loaded therein, the optical disk 2 will initially be searched to read VTS and VTSM VOBS data as well as the intermediate management information for the still picture files from the optical disk 2, and the management information be also held in the memory of the microcomputer 4.

Thus, the moving and still picture titles recorded in the optical disk 2 under the user's instruction can be provided to the user. Also, when the user instructs to read moving pictures, the optical disk drive 1 can read the moving picture files on the basis of the VTS and VTSM VOBS data as having been described concerning the read-only optical disk.

On the other hand, when the user instructs to read a still picture file, the address etc. of the file will be detected on the basis of the intermediate management information held in the memory of the microcomputer 4, data recorded in the optical disk 2 be sequentially read according to the result of detection, and processed through the operations similar to those in reading the moving pictures. In the optical disk drive 1, to process the read data including the still pictures in processing of the read data, the operation of the video processor 8 is changed by the microcomputer 4 to expand the video data having been compressed according to the JPEG, and video data including the still pictures is monitored on the monitor 12 and further can be supplied from the video/audio encoder 13 to an external apparatus.

Generally, the still picture file is smaller in size than the moving picture file. In the optical disk drive 1, however, intermediate management information as such management information is generated and recorded for a plurality of files as shown in FIG. 7. Thus in the optical disk drive 1, since an extension file composed of such still picture files or the like is recorded, it is possible to minimize the reduction of recording areas due to the recording of management files.

Also, the intermediate management information for a plurality of files is collectively recorded for each file type being the attribute of a file, whereby the operations for search and finalization (which will be described in detail later) can be simplified.

With the above operations, the optical disk drive 1 is operated by the user to sequentially record moving and still picture files to a so-called virgin disk, an optical disk having only moving pictures recorded therein but not yet finalized and an optical disk having moving and still picture files recorded therein but not yet finalized.

On the other hand, when the user instructs to finalize any of the above optical disks having moving and still pictures recorded therein as above, UDF data for a computer is generated based on the management information and intermediate management information, acquired from the optical disk and held in the memory of the microcomputer 4, as well as on the management information and intermediate management information generated by recording moving and still pictures and held in the memory, and the UDF data is recorded to a pre-defined area on the optical disk 2. Also, VMG data for a DVD player is generated according to only the management information for the moving picture file, and similarly recorded to the optical disk 2.

Thus in the optical disk drive 1, management information for all files recorded on the optical disk 2 will be recorded collectively in combination with the files to the UDF area for recording the first management information, of the management information recording area on the optical disk 2, while management information for only a moving picture file having a specific attribute, recorded in the optical disk 2, will be recorded in combination with the moving picture file to the VMG area intended for a DVD to record the second management information.

Thus, when the optical disk 2 finalized as above is reproduced by a DVD player, files recorded in the optical disk 2 will be read with reference to the DVD-oriented VMG area, whereby it is possible to positively read the DVD video-formatted moving pictures without being influenced by recording of the files such as still picture files.

When reproducing such a finalized optical disk by a computer, since the UDF is defined in a file management format corresponding to the file management system of the computer and the computer will read each file based on the UDF (as shown in FIG. 8), it is possible to read the moving picture file as well as the still picture file.

(1-3) Effect of the First Embodiment

In the optical disk drive 1 constructed as having been described in the foregoing, the management information recorded in combination with a file is converted in format according to the attribute of the file to permit recording also a still picture file other than a moving picture file, for example.

That is, a moving picture file is recorded in a sequence of management information, the file, backup information for the management information with the DVD video format being applied to the file and management information. On the other hand, any file other than a moving picture file is recorded in the order of the file and management information, and thus a file not defined in the DVD video format can be recorded without any influence on the reading of the moving picture file.

Also, by reading files of different attributes from the optical disk on the basis of the management information for other than the moving picture files recorded as above, any other file than a moving picture file can also be read for utilization.

Also, by collectively recording, under the user's instruction, management information in combination with all files recorded in the optical disk to the first management information recording area and management information in combination with only files having a specific attribute to the second management information recording area, it is possible to read the moving picture file by some ordinary DVD players and all the files of moving and still pictures by some computers.

(2) Second Embodiment (2-1) Construction of the Second Embodiment

In this second embodiment, the content of a still picture file recorded in the optical disk 2 as in the first embodiment can also be check by an ordinary DVD player or DVD recorder. It should be noted that the content checking in the second embodiment is destined for an optical disk not yet finalized.

Figure 12:
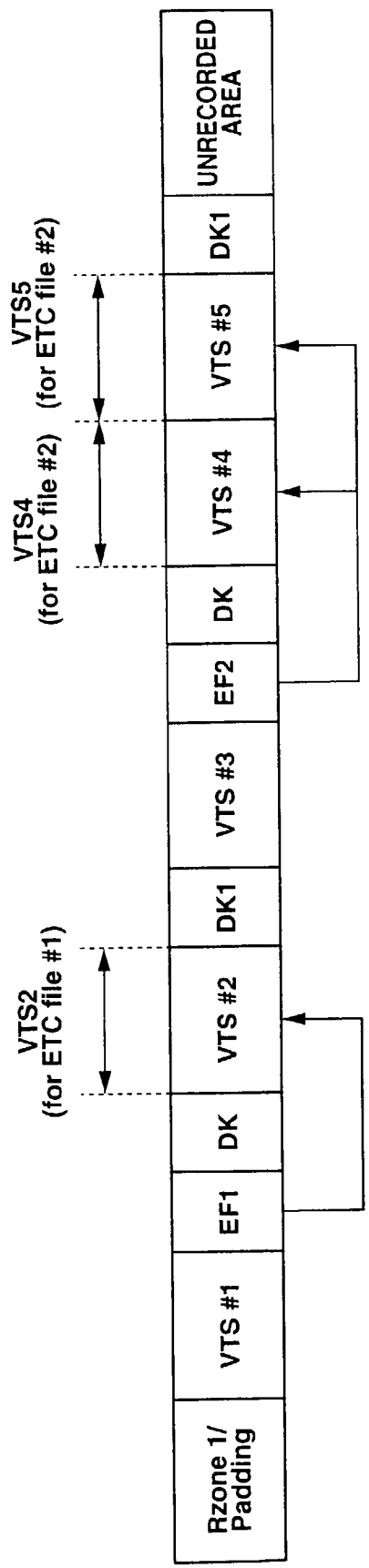
FIG. 12 explains recording in a second embodiment of the optical disk drive according to the present invention.

FIG. 12 explains the content checking in contrast with that in FIGS. 4 and 9. In this embodiment, of various files recorded in an extension format, one convertible to DVD video-formatted video data is converted to MPEG-formatted video data and re-recorded to the optical disk. Thus, the format-converted video data can be reproduced in another DVD recorded even if the optical disk containing the video data is not finalized.

Also for a format-converted file, management information for the file is recorded as intermediate management information DK1 to the optical disk for holding thereof there, and the optical disk is finalized to record VMG for reproduction of the format-converted video data. Also, in a computer, management information is generated for both a file before converted in format and the file converted in format and recorded to UDF area so that these files can be accessed similarly to another file.

Also, with these operations, one still picture in one file is converted in format to provide one MPEG-formatted picture. Further, a plurality of still picture files managed with one piece of intermediate management information is converted so that each format-converted picture will be included in a series of pictures in the DVD video format, and thus the plurality of still pictures can sequentially be read by the chaptering in the DVD video format.

Also, the file is formed for up to 99 chapters at this time. When the number of chapters is larger than 99, the file is broken into a plurality of files, to thereby prevent departing from the limitation by the DVD video format.

More specifically, in such an optical disk not yet finalized, there are reserved UDF and VMG areas starting at the inner-circumferential side by reserving Rzone1 or by padding, and VTS, extension file EF and intermediate management information DK for the extension file EF are recorded there, as shown in FIG. 12. In this condition, when it is instructed by the user to process the data for content checking, the extension file is detected based on the intermediate management information DK.

Such files include a JPEG-formatted still picture file, MPEG-7-formatted moving picture file, moving picture file composed of an AVI file, etc. Of these files, the moving file picture undergoes data decompression, then undergoes data compression again in the MPEG-2 format, and recorded as VTS to the optical disk 2. In FIG. 12, VTS #2 is a VTS resulted from the format converting.

On the other hand, the still picture file is decompressed or expanded, and then thinned to have a number of pixels corresponding to the MPEG-2 format. Further, the still picture file is set to I pictures and compressed in the MPEG-2 format. VTS #2 is generated for a plurality of still picture files grouped according to one piece of intermediate management information DK so that the I pictures thus generated from the still picture files will successively be laid, and format-converted data is recorded to the optical disk. Also, each I picture is generated so that each I picture will be one chapter in the DVD video format.

The format-converted files thus recorded are recorded as extension files other than moving picture files and intermediate management information is recorded after the extension files similarly to other files. The intermediate management information DK1 is composed as shown in FIG. 7.

For recording video data next, moving pictures and still pictures are coded as in the first embodiment and VTS #2 and EF2 are recorded. When it is instructed by the user to process the file for content checking of the still pictures, the data is converted in format to define a VTS. VTS #4 and #5 are resulted from a file division which is made because the number of pictures in the format-converted file is larger than 99.

Figure 13:
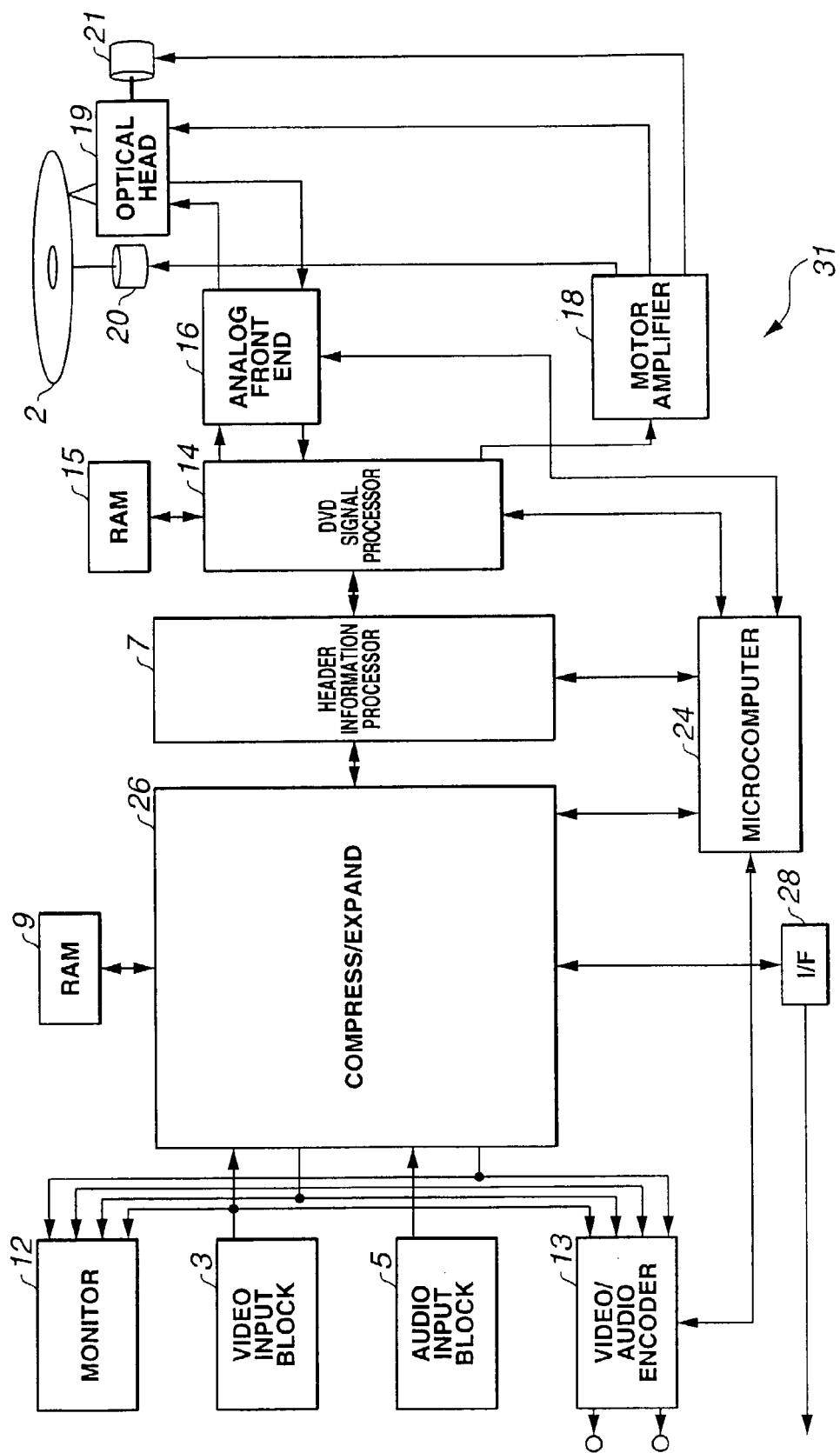
FIG. 13 is a block diagram of the optical disk drive shown in FIG. 12.

FIG. 13 is a block diagram of the second embodiment of the optical disk drive, presented in contrast with the first embodiment as shown in FIG. 5. The optical disk drive is generally indicated with a reference 31. The optical disk drive 31 includes a compress/expand block 26 formed from a processing circuit. The compress/expand block 26 is controlled by a microcomputer 24 to expand video data to be read from the optical disk 2 and which is formatted in any manner, and then format the video data in the MPEG-2 format above. The optical disk drive 31 also includes an interface (I/F) 28 by which it is connected to a computer. Thus, the optical disk drive 31 is able to acquire video data formatted in any manner, audio data, etc. for other than JPEG-formatted still pictures as well, and record the data thus acquired as extension files to the optical disk 2.

In addition to the functions of the aforementioned optical disk drive 1 according to the first embodiment of the present invention, the optical disk drive 31 can record various files each as an extension file to the optical disk 2, and also read and convert in format a still picture file and moving picture file of such extension files thus recorded and record the format-converted file to the optical disk 2. It should be noted that since the optical disk drive 31 is thus constructed identically to the optical disk drive 1 except some functional differences, so the same or similar elements thereof as or to those in the optical disk drive 1 will be indicated in FIGS. 13 and 14 with the same or similar references as or to those in FIGS. 5 and 6 and will not be described any longer.

Figure 14:
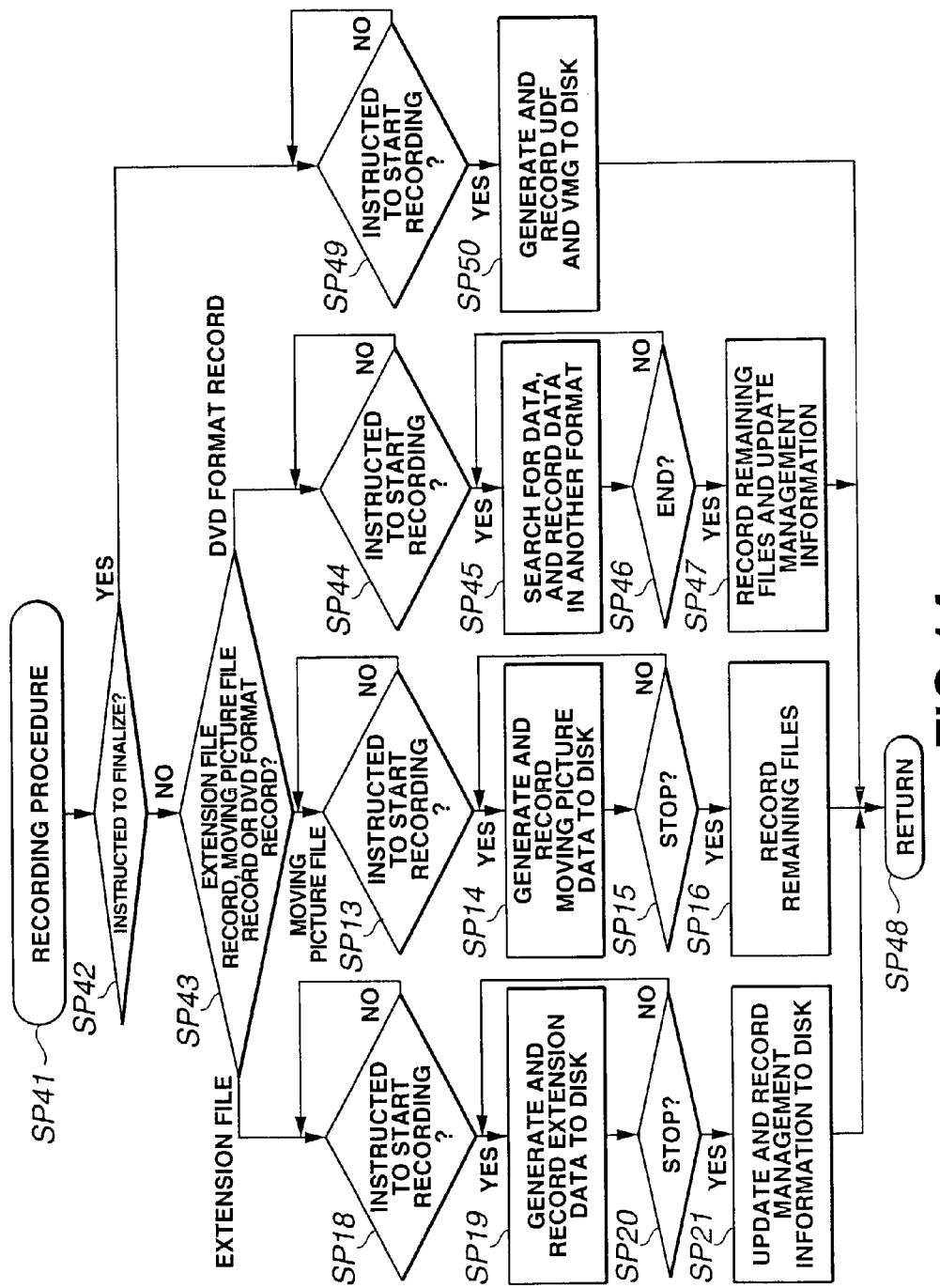
FIG. 14 shows a flow of operations made in the recording and reproducing procedure under the control of a microcomputer in the optical disk drive shown in FIG. 13.

FIG. 14 explains a flow of operations made in the recording procedure under the control of the microcomputer 24 in the optical disk drive 31, in contrast with those in FIG. 10. The microcomputer 24 conducts the recording procedure in addition to the processing procedure having previously been described with reference to FIG. 10.

More specifically, when the recording procedure is started in step SP41, the microcomputer 24 goes to step SP42 where it will judge whether the user has instructed to finalize the optical disk. If the result of judgment is negative, the microcomputer 24 goes to step SP43 where it will judge which the user has instructed, recording of an extension file, recording of an moving picture file or processing for checking of the content of the still picture file (recording in DVD video format).

When the user's instruction is determined to record an extension file, the microcomputer 24 will go through steps SP18, SP19, SP20 and SP21, as in the first embodiment, to record, to the optical disk 2, a still picture file acquired with the use of an imaging mean, a still picture file supplied from an external apparatus or various files supplied from the computer via the interface 28. It should be noted that when data supplied from the computer is to be recorded to the optical disk 2, the input data will be supplied directly to the header information processor 7 with interruption of the operation of the compress/expand block 26.

On the other hand, when the user's instruction is determined to record a moving picture file, the microcomputer 24 will go through steps SP13, SP14, SP15 and SP16 as in the first embodiment to record an moving picture file acquired from the imaging means to the optical disk 2.

On the other hand, when the user's instruction is determined to process the data for checking the content of a still picture file, the microcomputer 24 goes from step SP43 to SP44 where it will judge whether the user has instructed to start the operation. When the result of judgment is negative, the microcomputer 24 will repeat the operation in step SP44. On the contrary, when the result of judgment is affirmative, the microcomputer 24 goes from step SP44 to SP45 where it will search the program area for a format-convertible file. When such a file is detected, the microcomputer 24 will make the aforementioned format conversion of the file and recorded the format-converted file to the optical disk 2.

In next step SP46, the microcomputer 24 judges whether format conversion for recording the file to the optical disk 2 has been done. When the result of judgment is negative, the microcomputer 24 goes back to step SP45 where it will continuously do the due operation. On the contrary, when the result of judgment is affirmative, the microcomputer 24 goes to step SP47 where it will record VTSI BUP and intermediate management information DK1 for the file thus recorded, and reserve a next area by padding when the ROW method is adopted. Also, the microcomputer 24 will be back to the beginning, record VTSI and VTSM VOBS to define VTS, and return to the initial operation from step SP48.

On the other hand, when the user's instruction is determined to finalize the optical disk 2, the microcomputer 24 goes from step SP42 to STP49 where it will wait until an instruction comes from the user. When the user's instruction comes, the microcomputer 24 finalizes the optical disk 2 in step SP50, and return to the initial step from step SP48.

Figure 15:
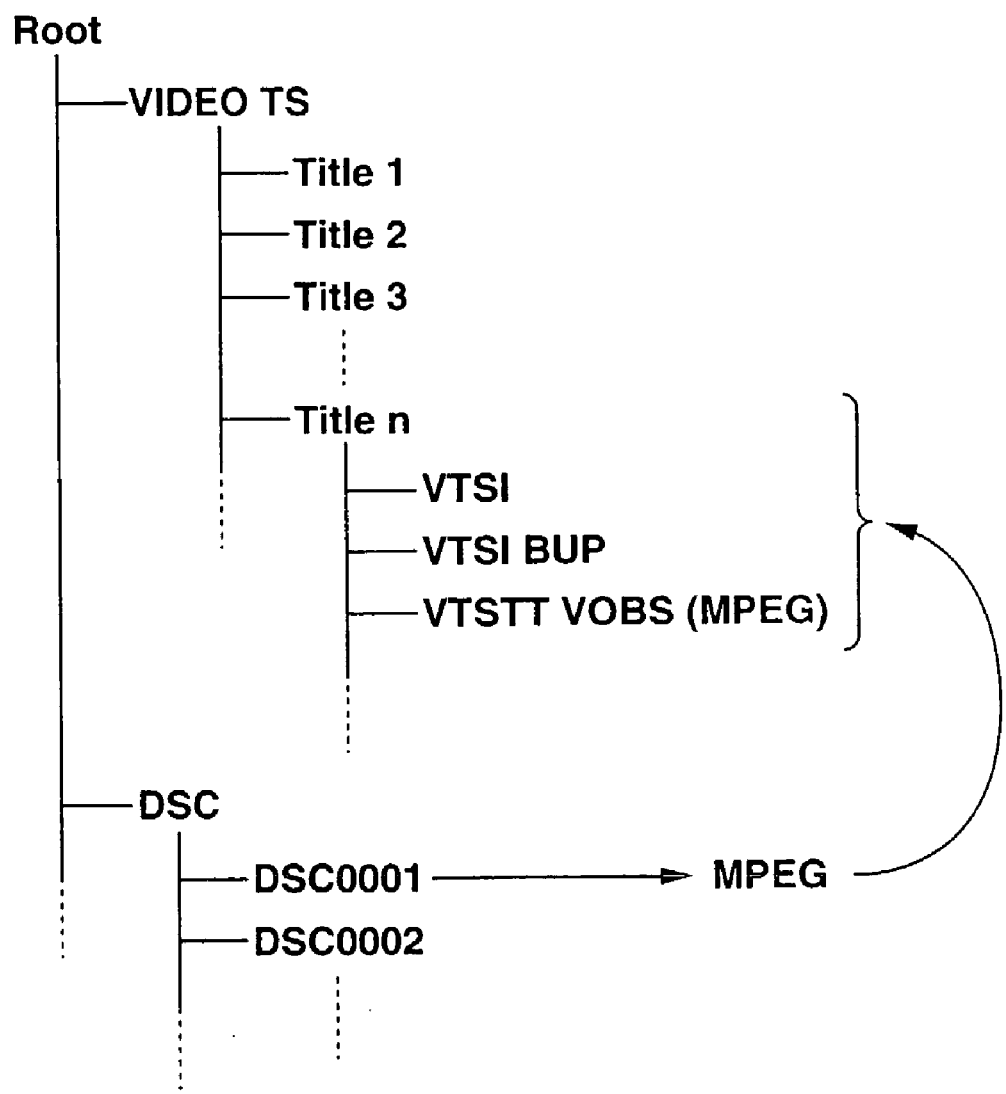
FIG. 15 explains the directory structure on the optical disk.

FIG. 15 explains the operation for content checking of the still picture file, in contrast with that in FIG. 8. FIG. 15 shows a directory structure on the optical disk in a computer. A still picture file indicated with "DSC0001" is converted into the MPEG format as indicated with an arrow for recording to the optical disk 2 in which the number n of titles will be increased.

(2-2) Effect of the Second Embodiment

In the second embodiment, a file recorded in the optical disk is converted in format for recording, whereby a file of still pictures other than moving pictures, recorded in the optical disk for example, can be recorded and the content of the still picture file can be checked even in a standard optical disk drive.

Also, since the file converted in format by the format conversion is an MPEG-based file, and by converting the still picture file into MPEG-based I pictures, the format-converted file can be reproduced by an ordinary DVD player to check the content of the still picture file.

Also, a file to be recorded to the program area is divided depending upon the number of format-converted pictures in the file. More specifically, by limiting the maximum number of chapters in a file to 99, even an ordinary DVD recorder is allowed to reproduce a format-converted file. Thus, even if many still picture files have been recorded together, it is possible to check the content of such still picture files.

Also, by recording, according to a user's instruction, management information for all files recorded in an optical disk to UDF area which is a first management information recording area, and management information for only a format-converted file, namely, only a file initially recorded in the MPEG-2 format and only a file recorded through format conversion to VMG area which is a second management information recording area, it is possible to check the content of the still picture even in the ordinary reproduce-only DVD player. In a computer, both a file not yet converted in format and a file converted in format can be reproduced, whereby both such files can be used as indexes to edit video data with the use of a still picture file not yet converted in format, and thus the optical disk drive according to the present invention can be operated with corresponding easiness.

(3) Third Embodiment

Figure 16:
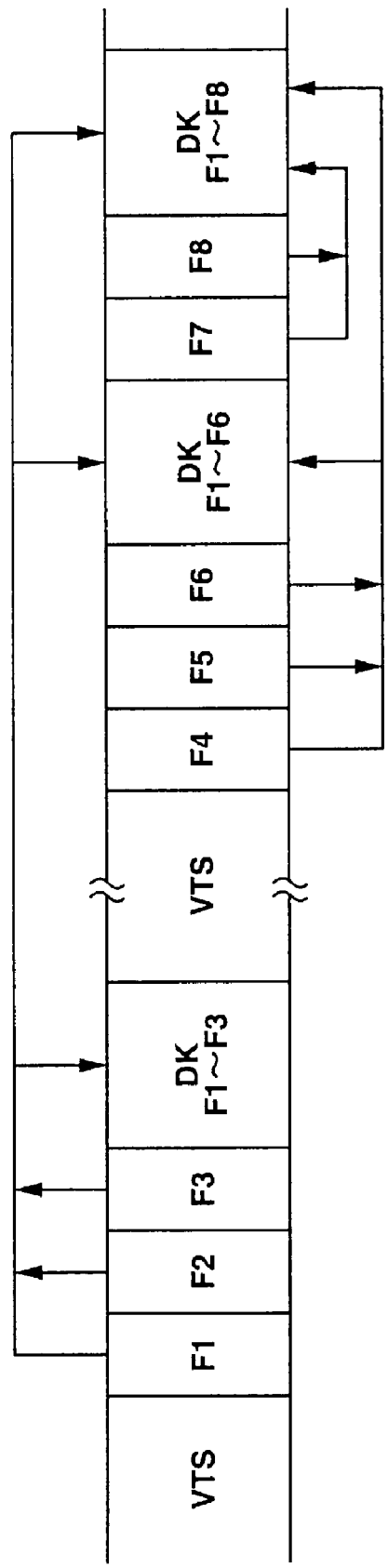
FIG. 16 explains recording in a third embodiment of the optical disk drive according to the present invention.

FIG. 16 is a chart for explaining how to record intermediate management information in contrast with that having previously been described with reference to FIG. 7. In the third embodiment of the optical disk drive according to the present invention, management information for all extension files having so far been recorded in the optical disk are allocated as intermediate management information to be recorded in combination with the extension files, as indicated with an arrow.

As will be seen from FIG. 16, just by reproducing the intermediate management information recorded at the end of a recorded area, it is possible to acquire management information such as address etc. of all intermediate files recorded in the optical disk, and the operation of search for the intermediate management information can be simplified correspondingly.

(4) Other Embodiments

The present invention has been described concerning the first to third embodiments thereof in which a series of operations is done according to a recording or reproducing program pre-installed to the optical disk drive, but it is not limited to these embodiments. That is, the present invention can widely be applied to making such a series of operations according to a program downloaded via a network such as the Internet or a program provided via a variety of recording media. Also it should be noted that the recording medium may be an magnetic disk, optical disk, a magnetic tape or the like.

Also the present invention has been described concerning the first to third embodiments thereof applied to an optical disk drive having an imaging function and an optical disk drive which is an external storage unit of a computer, but it is not limited to these embodiments. Namely, the present invention can also be applied to performance of the above recording and reproducing operations under an application program for a computer.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

As having been described in the foregoing, according to the present invention, a file of still pictures other than moving pictures for example can be recorded by converting the format of the management information to be recorded in combination with the file according to the attribute of the file. Thus, by converting the format of a file recorded in the optical disk and re-recording the file, a file of still pictures other than moving pictures for example can be recorded and the content of the still pictures can be checked even in a standard optical disk drive.

What is claimed is:

1. A recording apparatus for recording a moving picture file and a still picture file to a program area on an optical disk comprising:

a management information generating means for generating management information for a file to be recorded;

a recording means for recording the file in combination with the management information for the file to the program area on the optical disk, the file on the optical disk being reproducible on a standard DVD player that supports only DVD video format; and a control means for controlling the management information generating means and the recording means to successively record the file to continuous area of said program area:

wherein when the file is the moving picture file, the management information for the file and backup information for the management information are recorded, after the moving picture file is recorded with reserving recording area for the management information, the management information for the moving picture file, the moving picture file itself, and the backup information for the management information being recorded sequentially; and wherein when the file is the still picture file, the management information is recorded to successive area after the still picture file is recorded, the still picture file and the management information for the still picture file being recorded sequentially, and wherein the control means is instructed based on an instruction of an operation for finalization of the optical disk to control the management information generating means and the recording means to record:

first management information corresponding to a computer-based file management system, generated from the management information for all moving picture files and intermediate management information for all still picture files, to a first management information recording area of the management information recording area on the optical disk, wherein the intermediate management information for the still picture files comprising attribute extensions, addresses and sizes of the still picture files, and date and time when the still picture files are recorded to the optical disk; and second management information corresponding to a DVD video format-based file management system, generated from the management information for only moving picture files, to a second management information recording area of the management information recording area.

2. The apparatus as set forth in claim 1, wherein when the file is the moving picture file, recording of the management information, the file and the backup information for the management information complies with the DVD video format.

3. The apparatus as set forth in claim 1, wherein the management information recorded in the program area includes at least the address and size of the file.

4. The apparatus as set forth in claim 1, further comprising a reproducing means for reproducing the moving and still picture files recorded in the optical disk on the basis of the management information recorded in the program area.

5. The apparatus as set forth in claim 1, wherein the control means operates to:
  record the management information recorded in he program area to a memory and store the management information in the memory; and
  generate the management information to be recorded to the management information recording area from the management information stored in the memory.

6. The apparatus as set forth in claim 1, further comprising:
  a format converting means for converting the format of the still picture file to generate a moving picture file; and
  a reproducing means for reading the file recorded in the optical disk;
  the control means being instructed by the user to control the reproducing means to read a still picture file recorded in the optical disk and the format converting means to convert the still picture file to a moving picture file, for recording of the moving picture file along with the management information to the optical disk.

7. The apparatus as set forth in claim 6, wherein the format-converted file is MPEG-based.

8. The apparatus as set forth in claim 7, wherein the format converting means converts a still picture file to an MPEG-based I picture.

9. The apparatus as set forth in claim 8, wherein the control means divides, for recording, a file to be recorded to the program area depending upon the number of pictures in the format-converted file.

10. A recording method of recording a moving picture file and a still picture file to be recorded and management information for the files in combination to a program area on an optical disk, comprising:
  a management information generating step of generating management information for a file to be recorded;
  a recording step of recording the file in combination with the management information for the file to the program area on the optical disk, the file on the optical disk being reproducible on a standard DVD player that supports only DVD video format; and
  a control step of controlling the management information generating step and the recording step to successively record the file to continuous area of said program area:

wherein when the file is the moving picture file, the management information for the file and backup information for the management information are recorded, after the moving picture file is recorded with reserving recording area for the management information, the management information for the moving picture file, the moving picture file itself, and the backup information for the management information being recorded sequentially; and wherein when the file is the still picture file, the management information is recorded to successive area after the still picture file is recorded, the still picture file and the management information for the still picture file being recorded sequentially, and wherein the control step is instructed based on an instruction of an operation for finalization of the optical disk to control the management information generating step and the recording step to record:

first management information corresponding to a computer-based file management system, generated from the management information for all moving picture files and intermediate management information for all still picture files, to a first management information recording area of the management information recording area on the optical disk, wherein the intermediate management information for the still picture files comprising attribute extensions, addresses and sizes of the still picture files, and date and time when the still picture files are recorded to the optical disk; and second management information corresponding to a DVD video format-based file management system, generated from the management information for only moving picture files, to a second management information recording area of the management information recording area.

11. The method as set forth in claim 10, wherein when the file is the moving picture file, recording of the management information, the file and the backup information for the management information complies with the DVD video format.

12. The method as set forth in claim 10, wherein the management information recorded in the program area includes at least the address and size of the file.

13. The method as set forth in claim 10, wherein the moving and still picture files recorded in the optical disk is reproduced on the basis of the management information recorded in the program area.

14. The method as set forth in claim 10, wherein:
  the management information recorded in the program area is recorded to a memory and stored in the memory; and
  the management information to be recorded to the management information recording area is generated from the management information stored in the memory.

15. The method as set forth in claim 10, further comprising the step of:
  converting the format of the still picture file to generate a moving picture file; and
  reproducing the file recorded in the optical disk;
  controlling a still picture file recorded in the optical disk to be reproduced in the reproducing step;
  controlling the still picture file reproduced in the reproducing step to be converted to a moving picture file in the format converting step; and
  controlling the moving picture file to be recorded along with the management information to the optical disk.

16. The method as set forth in claim 15, wherein the format-converted file is MPEG-based.

17. The method as set forth in claim 16, wherein the format converting step converts a still picture file to an MPEG-based I picture.

18. The method as set forth in claim 17, wherein a file to be recorded to the program area is divided depending upon the number of pictures in the format-converted file for recording to the program area.

19. A non-transitory computer-readable medium encoded with a computer program for recording a moving picture file and a still picture tile to be recorded and management information for the files when executed comprising:

generating management information for a file to be recorded;

recording the file in combination with the management information for the file to the program area on the optical disk, the file on the optical disk being reproducible on a standard DVD player that supports only DVD video format; and controlling management information generating and recording to successively record the file to continuous area of said program area:

wherein when the file is the moving picture file, the management information for the file and backup information for the management information are recorded, after the moving picture file is recorded with reserving recording area for the management information, the management information for the moving picture file, the moving picture file itself, and the backup information for the management information being recorded sequentially; and wherein when the file is the still picture file, the management information is recorded to successive area after the still picture file is recorded, the still picture file and the management information for the still picture file being recorded sequentially, and wherein the control program code is instructed based on an instruction of an operation for finalization of the optical disk to control the management information generating and the recording to record:

first management information corresponding to a computer-based file management system, generated from the management information for all moving picture files and intermediate management information for all still picture files, to a first management information recording area of the management information recording area on the optical disk, wherein the intermediate management information for the still picture files comprising attribute extensions, addresses and sizes of the still picture files, and date and time when the still picture files are recorded to the optical disk; and second management information corresponding to a DVD video format-based file management system, generated from the management information for only moving picture files, to a second management information recording area of the management information recording area.

20. The program as set forth in claim 19, wherein when the file is the moving picture file, recording of the management information, the file and the backup information for the management information complies with the DVD video format.

21. The program as set forth in claim 19, further comprising the program code for:

converting the format of the still picture file to generate a moving picture file; and reproducing the file recorded in the optical disk;

controlling a still picture file recorded in the optical disk to be reproduced in the reproducing step;

controlling the still picture file reproduced in the reproducing step to be converted to a moving picture file in the format converting step; and controlling the moving picture file to be recorded along with the management information to the optical disk.

22. The program as set forth in claim 21, wherein the format converting step converts a still picture file to an MPEG-based I picture.

\* \* \* \* \*